US011897357B1

(12) United States Patent
Hinderer et al.

(10) Patent No.: US 11,897,357 B1
(45) Date of Patent: Feb. 13, 2024

(54) SCHEDULING SYSTEM AND METHOD FOR DISTRIBUTED AND UNRELIABLE ELECTRIC VEHICLE NODES FOR COMPUTE WORKLOADS

(71) Applicant: Mercedes-Benz Group AG, Stuttgart (DE)

(72) Inventors: Steffen Hinderer, Shoreline, WA (US); Natalie Grasser, Seattle, WA (US); Stephen Fortner, Port Orchard, WA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/194,035

(22) Filed: Mar. 31, 2023

(51) Int. Cl.
G06F 9/50 (2006.01)
B60L 53/66 (2019.01)
B60L 53/62 (2019.01)
B60L 53/64 (2019.01)

(52) U.S. Cl.
CPC ............... *B60L 53/66* (2019.02); *B60L 53/62* (2019.02); *G06F 9/5044* (2013.01); *B60L 53/64* (2019.02); *G06F 2209/503* (2013.01)

(58) Field of Classification Search
CPC .......... B60L 53/66; B60L 53/62; B60L 53/64; G06F 9/5044; G06F 2209/503
See application file for complete search history.

(56) References Cited

U.S. PATENT DOCUMENTS

| 11,327,804 B2 | 5/2022 | Moustafa et al. |
| 2019/0258467 A1* | 8/2019 | Frantz ................. G01C 21/3691 |
| 2021/0204021 A1* | 7/2021 | Kumar ................... H04L 65/612 |

FOREIGN PATENT DOCUMENTS

| CN | 113438621 A | 9/2021 |
| CN | 109379727 B | 10/2021 |
| CN | 114841345 A | 8/2022 |
| CN | 115080210 A | 9/2022 |

\* cited by examiner

*Primary Examiner* — Sisley N Kim
(74) *Attorney, Agent, or Firm* — Dority & Manning, P. A.

(57) ABSTRACT

Methods, computing systems, and technology for scheduling computing tasks to be performed by an unreliable device are presented. For example, a task management system may receive, from a first electric vehicle, vehicle data comprising computing capabilities of the first electric vehicle and an availability calendar of the first electric vehicle. Additionally, the system can generate, based on the computing capabilities of the first electric vehicle, a work package for the first electric vehicle. The work package can include a computing task for the first electric vehicle to complete. Moreover, the system can determine, based on the availability calendar, one or more transmission parameters for communicating the work package to the first electric vehicle. Subsequently, based on the transmission parameters, the system can transmit a request for the first electric vehicle to perform the computing task of the work package.

20 Claims, 9 Drawing Sheets

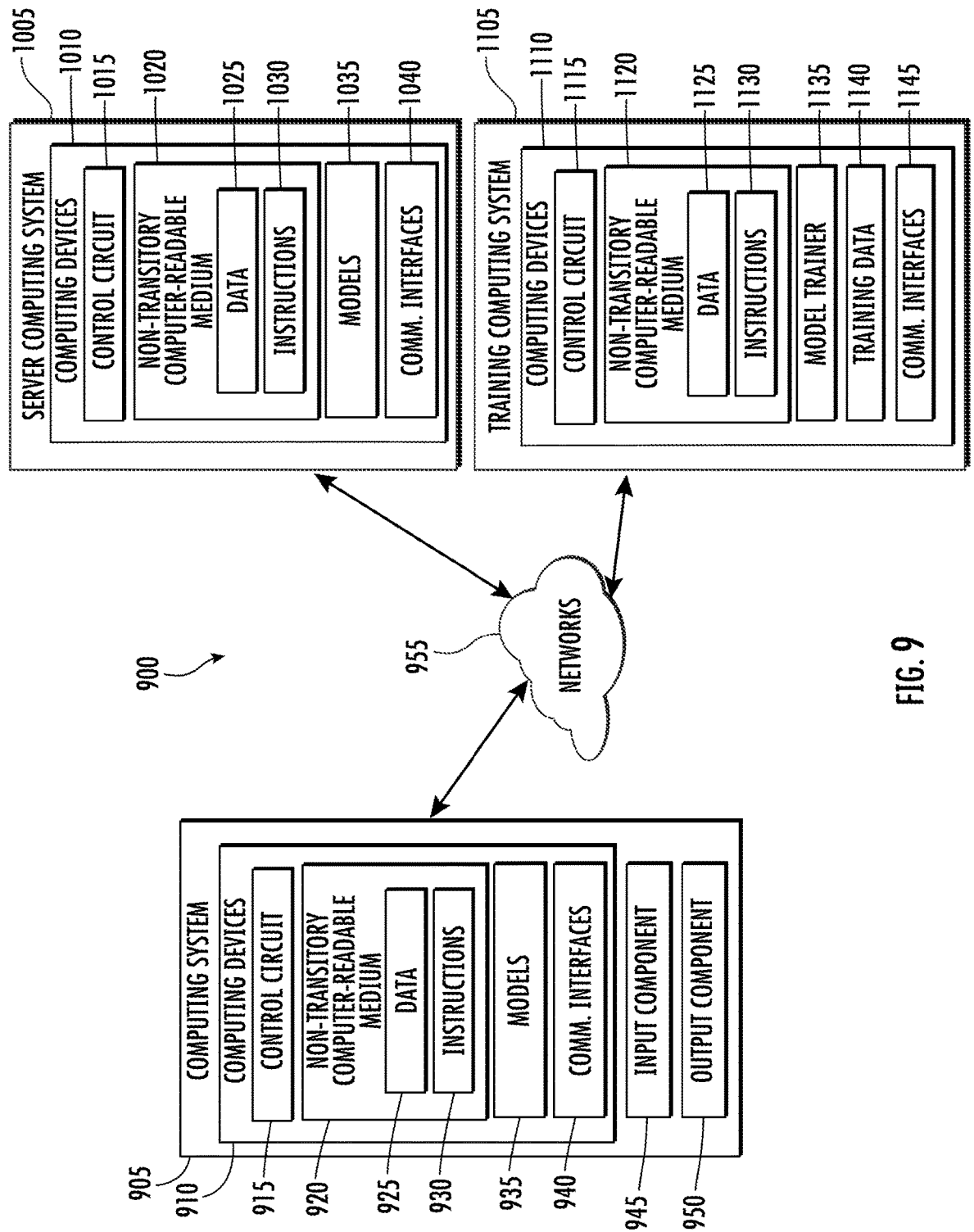

SCHEDULING SYSTEM AND METHOD FOR DISTRIBUTED AND UNRELIABLE ELECTRIC VEHICLE NODES FOR COMPUTE WORKLOADS

FIELD

The present disclosure relates generally to utilizing distributed and unreliable computing systems as nodes for general computing tasks. In particular, the present disclosure relates to predicting the availability of a modern vehicle to perform a computing task and utilizing a centralized management system to assign the vehicle to perform the computing task.

BACKGROUND

A work task management system for a distributed network of node agents is a system designed to manage and assign tasks to a network of node agents. Node agents refer to the individual computers or devices that are part of the distributed network.

The work task management system can break down large scale tasks or projects into smaller, more manageable subtasks and distribute them among the node agents in the network. The work task management system can also track the progress of each task and ensure that they are completed within a specified period.

Some examples of tasks that could be managed by a work task management system for a distributed network of node agents include data processing, scientific simulations, or complex computing tasks that require significant computational power.

In order to mitigate climate change, improved technologies with regards to a work task management system can reduce greenhouse gas emissions, reduce energy consumption, reduce production of additional servers, and reduce the environmental impact associated with mining of critical minerals.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The computer-implemented method may include receiving, from a first electric vehicle, vehicle data comprising computing capabilities of the first electric vehicle and an availability calendar of the first electric vehicle. The computing capabilities of the first electric vehicle may be determined onboard the first electric vehicle based on a performance analysis of one or more computing resources onboard the first electric vehicle. The availability calendar of the first electric vehicle may be determined onboard the vehicle and the availability calendar indicates a predicted network connectivity of the first electric vehicle. The computer-implemented method may include generating, based on the computing capabilities of the first electric vehicle, a work package for the first electric vehicle. The work package may include a computing task for the first electric vehicle to complete using at least a portion of the computing resources onboard the first electric vehicle. The computer-implemented method may include determining, based on the availability calendar, one or more transmission parameters for communicating the work package to the first electric vehicle, the transmission parameters comprising a time for transmitting the work package to the first electric vehicle. The computer-implemented method may include, based on the transmission parameters, transmitting a request for the first electric vehicle to perform the computing task of the work package.

In an embodiment, the method may include generating an electronic reward for a user of the first electric vehicle based on a completion of the computing task and a contribution to a reduction in greenhouse gas emissions.

In an embodiment, the request may include a cryptographic signature and a location of the work package.

In an embodiment, the work package may be stored in a work package storage. Additionally, the work package storage may include compute instructions and data for performing the computing task.

In an embodiment, the method may include receiving, from a work validator, a confirmation that the computing task has been performed. Additionally, the method may include generating a smart contract associated with the work package, the smart contract comprising the cryptographic signature and code indicative of an indication by the first electric vehicle that the first electric vehicle has performed the computing task.

In an embodiment, the method may include transmitting the smart contract to a blockchain interface. The blockchain interface may maintain a performance status of the computing task.

In an embodiment, the method may include determining that the computing task has not been performed by the first electric vehicle within a predetermined amount of time. Additionally, the method may include assigning, based on the determination that the computing task has not been performed by the first electric vehicle within the predetermined amount of time, the work package to be performed by a second electric vehicle.

In an embodiment, the method may include registering, in an agent inventory, the first electric vehicle as a node agent. The agent inventory may have a list of node agents. Additionally, each node agent in the list of node agents can include an associated availability calendar.

In an embodiment, the availability calendar can be determined by the first electric vehicle using one or more machine-learned models based on a network connection vector of the first electric vehicle and a compute mode availability calendar. Additionally, the availability calendar may be further determined based on user specific data that is only processed onboard the vehicle.

In an embodiment, the availability calendar may include a plurality of locations, and the network connection vector of the first electric vehicle may be indicative of a network connection of the first electric vehicle in each location of the plurality locations.

In an embodiment, the network connection vector of the first electric vehicle may be determined by performing a network connectivity speed test with the first electric vehicle.

In an embodiment, the work package may be indicative of at least one of: a minimum computing resources requirement, a completion date, and an effort level for performing the work package.

In an embodiment, the availability calendar may be a quantized calendar predicting a current state of the first electric vehicle and an operation state at a future period.

In an embodiment, the operation state of the first electric vehicle may be either an off state, a download state, or a compute state.

In an embodiment, the computing task may be performed by the first electric vehicle only during the compute state.

In an embodiment, the first electric vehicle may be restricted from performing the computing task during the download state.

In an embodiment, the availability calendar may include a network availability calendar that determines when the vehicle is able to transmit data over a network.

In an embodiment, the availability calendar may include a compute mode availability calendar that determines a specific time and a time duration that the vehicle is available to perform the computing task of the work package.

Another example aspect of the present disclosure is directed to a computing system including a control circuit of a task management system. The control circuit may be configured to receive, from a first electric vehicle, vehicle data having computing capabilities of the first electric vehicle and an availability calendar of the first electric vehicle. The computing capabilities of the first electric vehicle may be determined onboard the vehicle based on a performance analysis of one or more computing resources onboard the first electric vehicle. The availability calendar of the first electric vehicle may be determined onboard the vehicle and the availability calendar indicates a predicted network connectivity of the first electric vehicle. The control circuit may be configured to generate, based on the computing capabilities of the first electric vehicle, a work package for the first electric vehicle. The work package may include a computing task for the first electric vehicle to complete using at least a portion of the computing resources onboard the first electric vehicle. The control circuit may be configured to determine, based on the availability calendar, one or more transmission parameters for communicating the work package to the first electric vehicle, the transmission parameters comprising a time for transmitting the work package to the first electric vehicle. The control circuit may be configured, based on the transmission parameters, to transmit a request for the first electric vehicle to perform the computing task of the work package.

Yet another example aspect of the present disclosure is directed to one or more non-transitory computer-readable media that store instructions that are executable by a control circuit to perform operations. The control circuit may receive, from a first electric vehicle, vehicle data having computing capabilities of the first electric vehicle and an availability calendar of the first electric vehicle. The computing capabilities of the first electric vehicle may be determined onboard the first electric vehicle based on a performance analysis of one or more computing resources onboard the first electric vehicle. The availability calendar of the first electric vehicle may be determined onboard the vehicle and the availability calendar indicates a predicted network connectivity of the first electric vehicle. The control circuit may generate, based on the computing capabilities of the first electric vehicle, a work package for the first electric vehicle. The work package may include a computing task for the first electric vehicle to complete using at least a portion of the computing resources onboard the first electric vehicle. The control circuit may determine, based on the availability calendar, one or more transmission parameters for communicating the work package to the first electric vehicle. The transmission parameters may include a time for transmitting the work package to the first electric vehicle. The control circuit, based on the transmission parameters, may transmit a request for the first electric vehicle to perform the computing task of the work package.

These and other features, aspects, and advantages of various embodiments of the present disclosure will become better understood with reference to the following description and appended claims. The accompanying drawings, which are incorporated in and constitute a part of this specification, illustrate example embodiments hereof and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 9 illustrates a block diagram of a computing system according to example embodiments hereof.

DETAILED DESCRIPTION

Overview

Figure 1:
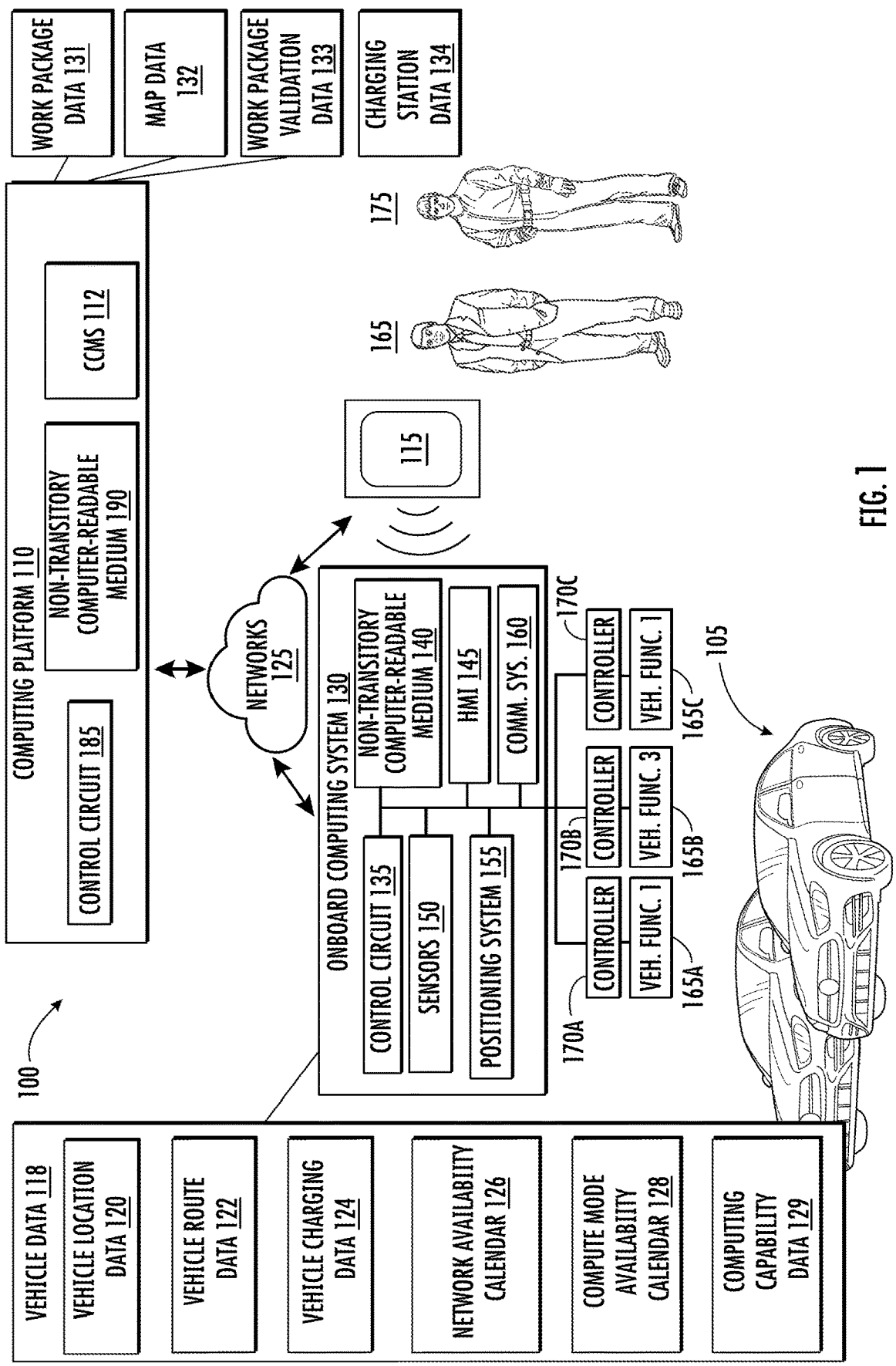
FIG. 1 illustrates a block diagram of an example computing ecosystem according to example embodiments hereof.

An aspect of the present disclosure relates to methods and computing systems for utilizing unreliable and distributed Internet of Things (IoT) devices as compute nodes for discrete computing tasks. In some instances, the IoT device can have an unpredictable availability of computing resources to perform the computing tasks. The ecosystem described herein can include a plurality of IoT devices having a decentralized client application, which can also be referred as a node agent, and a centralized compute management system (CCMS).

Cloud computing enables centralized compute management of node agents, while the increase in IoT devices in the modern computing landscape can potentially be utilized as a node agent to enable compute power to be available as part of the edge computing infrastructure. According to some embodiments of the present invention, techniques described herein enable using modern vehicles battery powered vehicles with capable hardware for automated driving and a continued power supply to be utilized as a node agent for performing a computing task of a work package.

Modern vehicles can be equipped with highly capable general computing hardware such as central processing units (CPUs), graphics processing units (GPUs), and even specialized hardware such as Machine Learning Accelerators. However, in the past, conventional systems have not used modern vehicles as a node agent in part because modern vehicles are unreliable and unpredictable with regards to having available computing resources to perform a computing task assigned by a CCMS. For example, while a vehicle is being driven, the computing resources of the vehicle will be utilized for processing tasks associated with driving the vehicle.

Recent studies have shown that the utilization of the computing resources onboard a modern vehicle may be less than 10% of a day on average. For example, a vehicle may be driven on average for less than three hours in a day. Therefore, if the availability of computing resources for non-driving purposes can be accurately predicted, then the computing resources of the modern vehicle can be available for most of the day (e.g., when the vehicle is not driven) to perform computing tasks that are assigned by the CCMS.

Additionally, the internet connectivity of the vehicle can vary and, in some instances, may not be available. By using the machine-learning techniques described herein, the system can accurately predict a vehicle's compute mode availability and network availability in order for the vehicle to become a reliable node agent to perform a computing task. For example, the compute mode availability can include time periods when a vehicle's computing resources are available for non-driving purposes, such as when a battery-powered electric vehicle is connected to a permanent power supply for charging over sustained periods (e.g., charging at night). The network availability can include time periods when the vehicle's internet connection is reliable such that the vehicle can download a work package in order to perform a computing task of the work package.

The machine-learning models can be stored in the onboard computing system. Additionally, if given permission by a user, the machine-learning models can be trained using user specific data in order to accurately predict both the vehicle's compute mode availability and network availability. The compute mode availability can indicate, based on user specific data, when a vehicle of a specific user may be available for performing computing tasks that are assigned by the CCMS. Network availability can indicate, based on user specific data, when a vehicle of a specific user may have a reliable wireless or wired network connection to download and upload data (e.g., work package). By maintaining and processing the user specific data using the onboard computing system (rather than a system offboard the vehicle), the system safeguards the privacy of a user.

The compute mode availability can be determined by a machine-learned model using the onboard computing system of the vehicle based on the user specific data. For example, the machine-learned model can determine, based on the user specific data, a plurality of time periods that has a high likelihood (e.g., 90% confidence level, 95% confidence level) of the vehicle not being driven. Predicted patterns of compute mode availability can be stored in a data structure such as, for example, a compute mode availability calendar.

Additionally, the network availability can be determined by a machine-learned model using the onboard computing system of the vehicle based on the user specific data. For example, the machine-learned model can determine, based on the user specific data, a plurality of time periods that has a high likelihood (e.g., 90% confidence level, 95% confidence level) that the vehicle will have a reliable network connection. Predicted patterns of network availability can be stored in a data structure such as, for example, a network availability calendar.

Each vehicle can be registered with the CCMS and be identified in a node inventory storing a list of registered node agents (e.g., vehicles). The vehicle can transmit their compute mode availability calendar and network availability calendar to the CCMS. The CCMS can then assign a work package to a node agent in the node agent inventory based on the compute mode availability calendar and the network availability calendar of the node agent. The CCMS can send a request to the assigned node agent to perform the computing task associated with the work package, as will be further described herein.

Subsequently, the node agent can download the work package from a work package storage and perform the computing task associated with the work package. Once a node agent has completed the computing task associated with the work package, the node agent can inform the CCMS that the task has been completed. The CCMS, using a work package validator can validate if the work package has been successfully completed. In some instances, when the work package is successfully completed, the node agent can receive a reward. The CCMS can generate the reward by initiating a smart contract using a blockchain interface. In other embodiments, the CCMS may interface with a non-blockchain interface that enables the generation of a contract associated with a reward for performing a computing task.

Although some of the techniques described herein focus on utilizing a modern vehicle as a host system, the techniques can be performed by any IoT device as a host system. The node agent, which may be installed in the host system, can be a separate component in the system. An IoT device can be a physical device that is connected to a network and can communicate with other devices, collect data, exchange data, and perform various functions without requiring human intervention. These devices can range from simple sensors that measure temperature or humidity to more complex devices such as home automation systems, smart appliances, industrial machinery, and modern vehicles. IoT devices can exchange data with other devices or with a centralized system (e.g., CCMS) for monitoring and control.

Example aspects of the present disclosure provide a number of technical effects and benefits. As one example, the present disclosure facilitates improvements to computing technology by improving the reliability of IoT devices, such as modern vehicles, as a node agent for performing computing tasks. By enabling previously unused computing resources (e.g., due to unreliability and unpredictability) to be used as node agents, this increases the availability of computing resources to perform a computing task, which can result in faster processing time to perform large scale tasks and projects.

The technology of the present disclosure helps to mitigate climate change within the environment and as it relates to transportation. For instance, the technology described herein can determine customized computing instructions and timeframes for each of a number of electric vehicle and leverage the respective electric vehicles to complete computing tasks during times that will not affect vehicle operation (e.g., while the vehicle is charging). This can lead to a minimization the use of energy of the computing, information, and communication technologies of the electric vehicles (and other systems) during the operation of such equipment (e.g., during driving). The technology of the present disclosure also helps to reduce greenhouse gas emissions. For instance, the systems and methods of the present disclosure encourage the use of electric vehicles. As described herein, a user of an electric vehicle that leverages a vehicle as a compute node can be provided with a reward for the completion of the task, as well as the use of the electric vehicle. The reward can also be reflective of the vehicle's contribution to reducing greenhouse gases based on its use, downtime computing, etc. Such technology can encourage adoption of electric vehicles, leading to an overall reduction of greenhouse gas emissions from automobiles or other types of transportation. Additionally, by utilizing the onboard computing system in the electric vehicle, the techniques described herein reduces energy consumption for performing these computing tasks. The onboard computing system are more efficient at performing the computing tasks and require less energy to perform the computing tasks in comparison to legacy and outdated computing systems, which consume more energy for performing the computing tasks. By reducing energy consumption for performing these computing tasks, the techniques described herein reduce the amount of energy that needs to be generated by powerplants, which in turn reduce greenhouse gas generation. Furthermore, by optimizing the usage of electric vehicles (e.g., using computing resources when vehicle is not being driven to process computing tasks), it reduces the global needs for building additional servers to process computing tasks. By reducing the global needs of building additional servers, it enables a reduction in the global demand of critical resources (e.g., rare earth elements, critical minerals) and also reduces the environmental impact of mining these critical resources. Moreover, given that the CCMS system takes the capabilities of the hardware when determining which node agent to assign a task, the system enables higher efficiency task allocations (e.g., a vehicle with a high end GPU and a low end CPU can be assigned tasks better suited for GPU processing instead of tasks better suited for CPU processing). The system can also calculate computation(s) per watt in order to reduce energy consumption by selecting the most energy efficient options. For example, the vehicles may also provide performance statistics that includes energy efficiency data to the CCMS system, and the CCMS system can assign a node agent based on the energy efficiency data.

The technology of the present disclosure improves the reliability of IoT devices by leveraging the predicted computing capabilities (and network connectivity) of the various node agents to select a node agent that is more likely to be able (and available) complete an assigned task. The technology also allows the CCMS to transmit the assigned computing task to the selected node agent during time periods of higher network speeds and quality, avoiding costly computational latencies. As such, the computing technology described herein can avoid wasting computing resources on re-work in selecting and assigning node agents due to incomplete task assignments.

Additionally, techniques described herein safeguard the privacy of users by safeguarding user specific data having mechanisms that prevent the centralized management system from accessing the user specific data. For example, the techniques described herein include the onboard processing and removal of any user specific information to avoid transmitting any user data to the CCMS. As such, the node agents (e.g., vehicles) can be utilized as secured agents, while limiting costly and computationally complex encryption software on the CCMS.

The technology of the present disclosure can improve the efficiency of the computing resources of the CCMS. For instance, by calibrating the computing tasks assigned to a particular vehicle based on the vehicle's onboard computing capabilities that are predicted to be available, the CCMS can assign discrete computing tasks that can be completed by a single vehicle. Accordingly, the CCMS can avoid using computationally expensive algorithms for splitting computational tasks into sub-tasks to assign them to a number of different node agents for execution. Moreover, the CCMS can avoid complex algorithms for aggregating completed sub-tasks to achieve a wholistic computing result. This can allow the CCMS to utilize its resources for its core responsibilities such as, for example, improved node agent allocation and complete validation.

Example Systems

With reference now to the figures, example embodiments hereof will be discussed in further detail. It should be noted that the examples provided herein that describe certain functions being performed by certain systems are provided for illustrative purposes only and are not meant to be limiting. For example, operations described as being performed by a lead vehicle (or follower vehicle) may be performed in another computing system (e.g., a cloud based platform system), or vice versa.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 165. The user 165 may be a driver of the vehicle. In an embodiment, the user 165 may be a passenger of the vehicle. The vehicle 105, the computing platform 110, and the user device 115 may be configured to communicate with one another via one or more networks 125.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 125 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may include one or more back-end services for supporting the vehicle 105. The services may include, for example, a centralized compute management system (CCMS) 112, tele-assist services, navigation/routing services, performance monitoring services, etc. The computing platform 110 may host or otherwise include one or more APIs for communicating data to/from an onboard computing system 130 of the vehicle 105 or the user device 115.

The computing platform 110 may include one or more computing devices. For instance, the computing platform 110 may include a control circuit 185 and a non-transitory computer-readable medium 190 (e.g., memory). The control circuit 185 of the computing platform 110 may be configured to perform the various operations and functions described herein. In an embodiment, the control circuit 185 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 185 may be programmed by one or more computer-readable or computer-executable instructions stored on the non-transitory computer-readable medium 190.

In an embodiment, the non-transitory computer-readable medium 190 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 190 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), or a memory stick. In some cases, the non-transitory computer-readable medium 190 may store computer-executable instructions or computer-readable instructions, such as instructions to perform the operations and methods described herein.

The non-transitory computer-readable medium 190 may store information that may be accessed by the control circuit 185. For instance, the non-transitory computer-readable medium 190 (e.g., one or more non-transitory computer-readable storage mediums, memory devices) may store data that may be obtained, received, accessed, written, manipulated, created, or stored. The data may include, for instance, data obtained from the onboard computing system 130 such as but not limited to vehicle data 118.

The vehicle data can include vehicle location data 120, vehicle route data 122, vehicle charging data 124, network availability calendar 126, compute mode availability calendar 128, and computing capability data 129. The data may additionally include data received from other databases such as but not limited to work package data 131, map data 132, work package validation data 133, or charging station data 134. In an embodiment, the computing platform 110 may obtain data from one or more memory devices that are remote from the computing platform 110. The computing capability data 129 can include data based on each host system or node agent conducting a self-assessment of its compute capabilities by running standardized performance benchmarks on available hardware (e.g., GPU, CPU, ML accelerators).

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 185 to perform one or more functional tasks. The modules and computer-readable/executable instructions may be described as performing various operations or tasks when a control circuit or other hardware component is executing the modules or computer-readable instructions.

The user device 115 may be, or otherwise include, a computing device owned or otherwise accessible to the user 165. For instance, the user device 115 may be or otherwise include a phone, laptop, tablet, wearable device (e.g., smart watch, smart glasses, headphones), personal digital assistant, gaming system, personal desktop devices, other handheld devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc. In an embodiment, the user device 115 may include a component such as, for example, a touchscreen, configured to perform input and output functionality to receive user input and present information for the user 165. The user device 115 may execute one or more instructions to run an instance of a software application and present user interfaces associated therewith. The launch of a software application for a respective transportation platform may initiate a user-network session with the computing platform 110.

The networks 125 may be any type of network or combination of networks that allows for communication between devices. In an embodiment, the networks 125 may include one or more of a local area network, wide area network, the Internet, secure network, cellular network, mesh network, peer-to-peer communication link or some combination thereof and may include any number of wired or wireless links. Communication over the networks 125 may be accomplished, for instance, via a network interface using any type of protocol, protection scheme, encoding, format, packaging, etc. Communication between the onboard computing system 130 of the vehicle 105 and the user device 115 may be facilitated by near field or short range communication techniques (e.g., Bluetooth low energy protocol, radio frequency signaling, NFC protocol).

The vehicle 105 may be a vehicle that is operable by the user 165. In an embodiment, the vehicle 105 may be an automobile or another type of ground-based vehicle that is manually driven by the user 165. For example, the vehicle 105 may be a Mercedes-Benz® car or van. In an embodiment, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In an embodiment, the vehicle 105 may be a fully or semi-autonomous vehicle.

The vehicle 105 may include a power train and one or more power sources. The power train may include a motor, e-motor, transmission, driveshaft, axles, differential, e-components, gear, etc. The power sources may include one or more types of power sources. For example, the vehicle 105 may be a fully electric vehicle (EV) that is capable of operating a power train of the vehicle 105 (e.g., for propulsion) and the vehicle's onboard functions using electric batteries. In an embodiment, the vehicle 105 may include hybrid power sources such as, for example, a combination of combustible fuel and electricity.

Certain routine and conventional components of vehicle 105 (e.g., an engine) are not illustrated or discussed herein for the purpose of brevity. One of ordinary skill in the art will understand the operation of conventional vehicle components in vehicle 105.

The vehicle 105 may include an onboard computing system 130 that is onboard the vehicle 105. The onboard computing system 130 may be located onboard the vehicle 105 in that it is included on or within the vehicle 105. The onboard computing system 130 may include one or more computing devices, which may include various computing hardware components. For instance, the onboard computing system 130 may include a control circuit 135 and a non-transitory computer-readable medium 140 (e.g., memory).

The control circuit 135 may be configured to perform the various operations and functions for implementing the technology described herein.

In an embodiment, the control circuit 135 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 135 or onboard computing system 130 may be part of, or may form, a vehicle control unit (also referred to as a vehicle controller) that is embedded or otherwise disposed in the vehicle 105 (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior and interior controller (CEIC), a zone controller, or any other controller (the term "or" and "and" may be used interchangeably herein).

In an embodiment, the control circuit 135 may be programmed by one or more computer-readable or computer-executable instructions stored on the non-transitory computer-readable medium 140.

In an embodiment, the non-transitory computer-readable medium 140 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 140 may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), or a memory stick. In some cases, the non-transitory computer-readable medium 140 may store computer-executable instructions or computer-readable instructions, such as instructions to perform the methods of FIGS. 7 and 8. Additionally, or alternatively, similar such instructions may be stored in the computing platform 110 (e.g., the non-transitory computer-readable medium 190) and provided over the networks 125.

In an embodiment, the non-transitory computer-readable medium 140 may store vehicle data 118 that describes aspects of the vehicle 105, such as make, model, year, serial number, software/firmware versions, or other vehicle aspects. In an embodiment, the vehicle data 118 stored in non-transitory computer-readable medium 140 may also include vehicle location data 120, vehicle route data 122, vehicle charging data 124, a network availability calendar 126, compute availability calendar 128, and computing capability data 129. For example, vehicle data 118 may include at least one portion of location data that maintains operator privacy by focusing on passive location data as opposed to active motion tracking. In an embodiment, vehicle data 118 may include basic vehicle identifier information, such as vehicle type, vehicle size, vehicle class, vehicle battery type and corresponding range data, or other identification of function information associated with the one or more vehicles 105. As another example, the vehicle data 118 may include vehicle location data 120 indicating locations of the vehicle 105 during operation, while parked. The onboard computing system 130 may be configured to perform some or all operations for collection or determination of vehicle data 118. As yet another example, the vehicle data 118 may include network availability calendar 126 that is determined onboard the vehicle 105. The network availability calendar 126 may indicate a predicted network connectivity of the vehicle, as will be further described herein.

As yet another example, the vehicle data 118 may include compute mode availability calendar 128 that is determined onboard the vehicle 105. The compute mode availability calendar 128 may indicate a predicted period of time that the vehicle is available to process computing tasks (e.g., non-driving computing tasks) of a work package, as will be further described herein. As yet another example, the vehicle data 118 may include computing capability data 129 which can include data associated with the computing capabilities of the onboard computing system 130. The computing capability data 129 can be determined onboard the vehicle 105 based on a performance analysis of one or more computing resources onboard the vehicle. In an example, the computing capabilities may indicate the overall computing resources (e.g., processing, memory, bandwidth) of the vehicle 105. In some embodiments, the computing capabilities may indicate the computing resources of the vehicle 105 that may be utilized or available during a certain time frame. This may include, for example, indicating that a certain percentage of GPUs or other processing resources of the vehicle 105 are available within a certain time frame.

The vehicle location data 120 stored in non-transitory computer-readable medium 140 may be determined in part from sensor output associated with sensors 150 and/or positioning system 155. For example, vehicle location data 120 may indicate coordinates, waypoints, semantic locations, etc. of the vehicle 105. This type of information may be based on signals such as, for example, GPS signals. In some implementations, vehicle location data 120 may include localization data including the position of the vehicle 105 within is current environment within six degrees of freedom.

The vehicle data 118 may additionally, or alternatively, include vehicle route data 122 descriptive of a plurality of travel events associated with the vehicle 105. The vehicle route data 122 may indicate, for a respective travel event of the plurality of travel events, a respective origin, and a respective destination. A travel event may include a route from an origin location to a destination location. A travel event may be associated with a user 165 entering a route request into a navigation system of the vehicle 105.

In some instances, the vehicle route data 122 may provide one or more measures associated with the travel events. In an embodiment, vehicle route data may include a frequency or quantity of times that the plurality of travel events include travel between the respective origin and the respective destination. The vehicle route data 122 stored in non-transitory computer-readable medium 140 may be determined, similar to vehicle location data 120, from positioning system 155. In addition, vehicle route data 122 may also be obtained from one or more navigational systems provided onboard vehicle 105. In an embodiment, onboard computing system 130 or computing platform 110 may process vehicle location data 120 or other vehicle data 118 to determine the vehicle route data 122 including travel events and associated origins and destinations thereof.

The vehicle data 118 may additionally, or alternatively, include vehicle charging data 124. For example, the vehicle charging data 124 may be indicative of charging events associated with the one or more vehicles 105. The vehicle charging data 124 may include a current or future predicted state-of-charge of the vehicle 105. In some instances, the vehicle charging data 124 may be correlated with the vehicle location data 120. For example, the vehicle charging data 124 may include a home location of the user, which can also be the location of the vehicle at night. The vehicle charging data 124 may additionally, or alternatively, include vehicle range data associated with a battery range of the one or more vehicles 105.

The vehicle charging data 124 stored in non-transitory computer-readable medium 140 may be predetermined or may be determined, at least in part, by communication of the onboard computing system 130 with one or more electric batteries provided within the vehicle 105. In such manner, the onboard computing system 130 may periodically monitor respective electric batteries to determine a total charging capacity, a current battery charge level, an expected time left until recharging is needed, or other real-time vehicle charging data parameters associated with a particular vehicle 105. The vehicle charging data 124 may additionally, or alternatively, include data associated with historic or current charging activity. For example, the vehicle charging data may include timestamps indicative of when charging occurred, location data indicative of where charging occurred, charge rate data indicative of how fast charging occurred, charging metrics that combine one or more of these aspects in a cumulative manner (e.g., to determine frequencies or rankings or charging activity data), etc.

In an embodiment, the onboard computing system 130 may process the vehicle data 118, including vehicle location data 120, vehicle route data 122, vehicle charging data 124, network availability calendar 126, or compute mode availability calendar 128 to remove private information, such as but not limited to active movement of vehicle 105 when not permitted by an operator of vehicle 105. The private information may include user specific data such as, for example, personally identifiable information. For example, the user specific data can include current location information of the vehicle, previous location information of the vehicle, route information from start location to destination location, personal calendar information, work calendar information, travel information, information that can enable the identification of a user, and so on. The onboard computing system 130 may additionally process the vehicle data 118, including vehicle location data 120, vehicle route data 122, vehicle charging data 124, network availability calendar 126, or compute mode availability calendar 128 directly in the vehicle 105 to determine the availability calendar(s) in order to prevent any private information (e.g., vehicle owner, vehicle operator, active locations), encrypted or otherwise, from being transmitted off of the vehicle 105 or used in any meaningful way. Thus, the vehicle 105 may preserve the privacy of its occupants as well as surrounding persons.

To remove private information, the onboard computing system 130 may utilize one or more data scrubbing or data cleansing techniques. These techniques may be applied to identify, remove, delete, or normalize certain data. The onboard computing system may utilize encryption techniques and other methods for securely storing user specific data or other private information onboard the vehicle 105, if permission for such storage/data collection is granted by an associated user. The processes used for scrubbing any private information can include the use of algorithms and software that are configured identify certain types of information to be removed from the data (e.g., a driver's name, etc.) and delete such information from the data to prepare it for transmission. In this manner, the data analyzed and created onboard the computing system 130 may be locally anonymized (e.g., on the vehicle 105) before transmission to any system offboard the vehicle 105 (e.g., computing platform 110, CCMS 112).

The onboard computing system 130 (e.g., the control circuit 135) may be configured to communicate with the other components of the vehicle 105 via a communication channel. The communication channel may include one or more data buses (e.g., controller area network (CAN)), onboard diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the onboard computing system 130, may act as an external buffer or repository for storing information. In such an example, the onboard computing system 130 may retrieve or otherwise receive the information from the non-transitory computer-readable medium 140.

The vehicle 105 may include one or more human-machine interfaces (HMIs) 145. The human-machine interfaces 145 may include a display device, as described herein. The display device (e.g., touchscreen) may be viewable by a user of the vehicle 105 (e.g., user 165, second user 175) that is located in the front of the vehicle 105 (e.g., driver's seat, front passenger seat). Additionally, or alternatively, a display device (e.g., rear unit) may be viewable by a user that is located in the rear of the vehicle 105 (e.g., back passenger seats).

The vehicle 105 may include one or more sensors 150. The sensors 150 may be configured to acquire sensor data. This may include sensor data associated with the surrounding environment of the vehicle 105, sensor data associated with the interior of the vehicle 105, or sensor data associated with a particular vehicle function. The sensor data may be indicative of conditions observed in the interior of the vehicle, exterior of the vehicle, or in the surrounding environment. For instance, the sensor data may acquire image data, inside/outside temperature data, weather data, data indicative of a position of a user/object within the vehicle 105, weight data, motion/gesture data, audio data, or other types of data. The sensors 150 may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors. The vehicle 105 may also include other sensors configured to acquire data associated with the vehicle 105. For example, the vehicle 105 may include inertial measurement units, wheel odometry devices, or other sensors. The vehicle data 118 can include data derived from the sensors 150.

The vehicle 105 may include a positioning system 155. The positioning system 155 may be configured to generate position data (also referred to as location data) indicative of a position (also referred to as a location) of the vehicle 105. For example, the positioning system 155 may determine position by using one or more of inertial sensors (e.g., inertial measurement units, etc.), a satellite positioning system, based on IP address, by using triangulation or proximity to network access points or other network components (e.g., cellular towers, Wi-Fi access points, etc.), or other suitable techniques. The positioning system 155 may determine a current location of the vehicle 105. The location may be expressed as a set of coordinates (e.g., latitude, longitude), an address, or a semantic location (e.g., "at work"). The vehicle data 118 can include data derived from the positioning system 155.

In an embodiment, the positioning system 155 may be configured to localize the vehicle 105 within its environment. For example, the vehicle 105 may access map data (e.g., map data 132) that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), or other traffic signals or control devices/markings (e.g., cross walks)); or any other data. The positioning system 155 may localize the vehicle 105 within the environment (e.g., across multiple axes) based on the map data. For example, the positioning system 155 may process sensor data (e.g., LIDAR data, camera data, etc.) to match it to a map of the surrounding environment to get an understanding of the vehicle's position within that environment. The determined position of the vehicle 105 may be used by various systems of the onboard computing system 130 or provided to the computing platform 110.

The vehicle 105 may include a communications system 160 configured to allow the vehicle 105 (and its onboard computing system 130) to communicate with other computing devices. The onboard computing system 130 may use the communications system 160 to communicate with the computing platform 110 or one or more other remote computing devices over a network 125 (e.g., via one or more wireless signal connections). In an embodiment, the communications system 160 may allow communication among one or more of the systems onboard the vehicle 105.

In an embodiment, the communications system 160 may be configured to allow the vehicle 105 to communicate with or otherwise receive data from the user device 115. The communications system 160 may utilize various communication technologies such as, for example, Bluetooth low energy protocol, radio frequency signaling, or other short range or near field communication technologies. The communications system 160 may include any suitable components for interfacing with one or more networks, including, for example, transmitters, receivers, ports, controllers, antennas, or other suitable components that may help facilitate communication.

The vehicle 105 may include a plurality of vehicle functions 165A-C that require the computing resources of the vehicle 105. The compute mode availability calendar 128 can predict when the vehicle is not performing the plurality of vehicle functions 165A-C, such that the computing resources of the vehicle are available to perform computing tasks requested by the CCMS 112.

A vehicle function 165A-C may be a functionality that the vehicle 105 is configured to perform based on a detected input. The vehicle functions 165A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The vehicle navigation functions may control the vehicle's system for providing a route to a particular destination. For example, the vehicle 105 may include an onboard navigation system that provides a route to the user 165 for traveling to a destination. The navigation system may leverage map data and global positioning system (GPS) based signals to provide guidance to the user 165 via a display device within the interior of the vehicle 105. The vehicle parking functions may control the vehicle's parking-related features. In an embodiment, the vehicle parking function may include a parking camera function that controls a side, rear, or three-hundred-sixty-degree camera to assist a user 165 when parking the vehicle 105. Additionally, or alternatively, the vehicle parking function may include a parking assistance function that helps to maneuver the vehicle 105 into a parking area. The vehicle entertainment functions may control one or more entertainment-related features of the vehicle 105. For example, the vehicle entertainment functions may include a music function for controlling a radio or controlling another source of audio or visual media. The vehicle entertainment functions may control sound parameters (e.g., volume, bass, treble, speaker distribution) or select a radio station or media content type/source.

Each vehicle function may include a controller 170A-C associated with that particular vehicle function 165A-C. The controller 170A-C for a particular vehicle function may include control circuitry configured to operate its associated vehicle function 165A-C. For example, a controller may include circuitry configured to turn the seat heating function on, to turn the seat heating function off, set a particular temperature or temperature level, etc.

The technology of the present disclosure allows the vehicle 105 to predict when the resources of its onboard computing system 130 may be available to perform computing tasks, other than those for operating the vehicle. Moreover, the technology of the present disclosure allows the vehicle to predict when it will be connected to one or more networks 125 to be able to receive instructions for performing an assigned computing task from, for example, CCMS 112. As will be further described below, this can allow the vehicle 105 to operate as a node agent for CCMS 112 in a manner that protects user specific data while also increasing the reliability of the vehicle to complete an assigned computing task.

Figure 2:
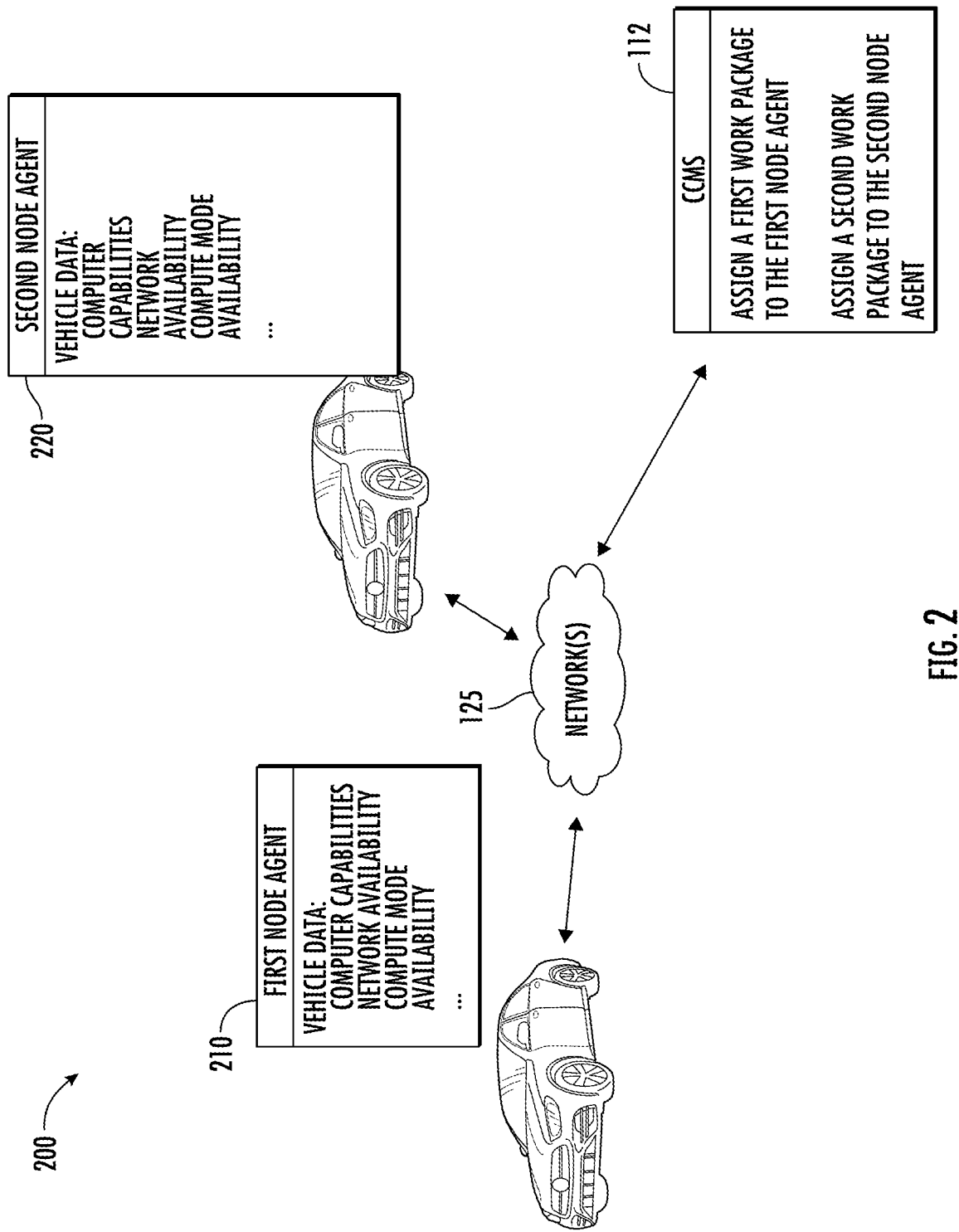
FIG. 2 illustrates a high level diagram of an example ecosystem according to an embodiment hereof.

FIG. 2 illustrates a high level diagram of example computing ecosystem 200 according to an embodiment hereof. The ecosystem 200 may include a first node agent 210, a second node agent 220, and the CCMS 112. The first node agent 210, the second node agent 220, and the CCMS 112 may be configured to communicate with one another via one or more networks 125.

In an example, the first node agent 210 may be a vehicle and the second node agent 220 may be a vehicle as shown in FIG. 2. The representation of node agents 210 and 220 is not meant to be limiting as other IoT devices may be utilized as node agents within the technology of the present disclosure.

The first node agent 210 can transmit vehicle data (e.g., vehicle data 118) to the CCMS 112 via the one or more networks 125. Additionally, the second node agent 220 can transmit vehicle data (e.g., vehicle data 118) to the CCMS 112 via the one or more networks 125. The CCMS 112 can receive vehicle data from a plurality of node agents (e.g., first node agent 210, second node agent 220).

Figure 4:
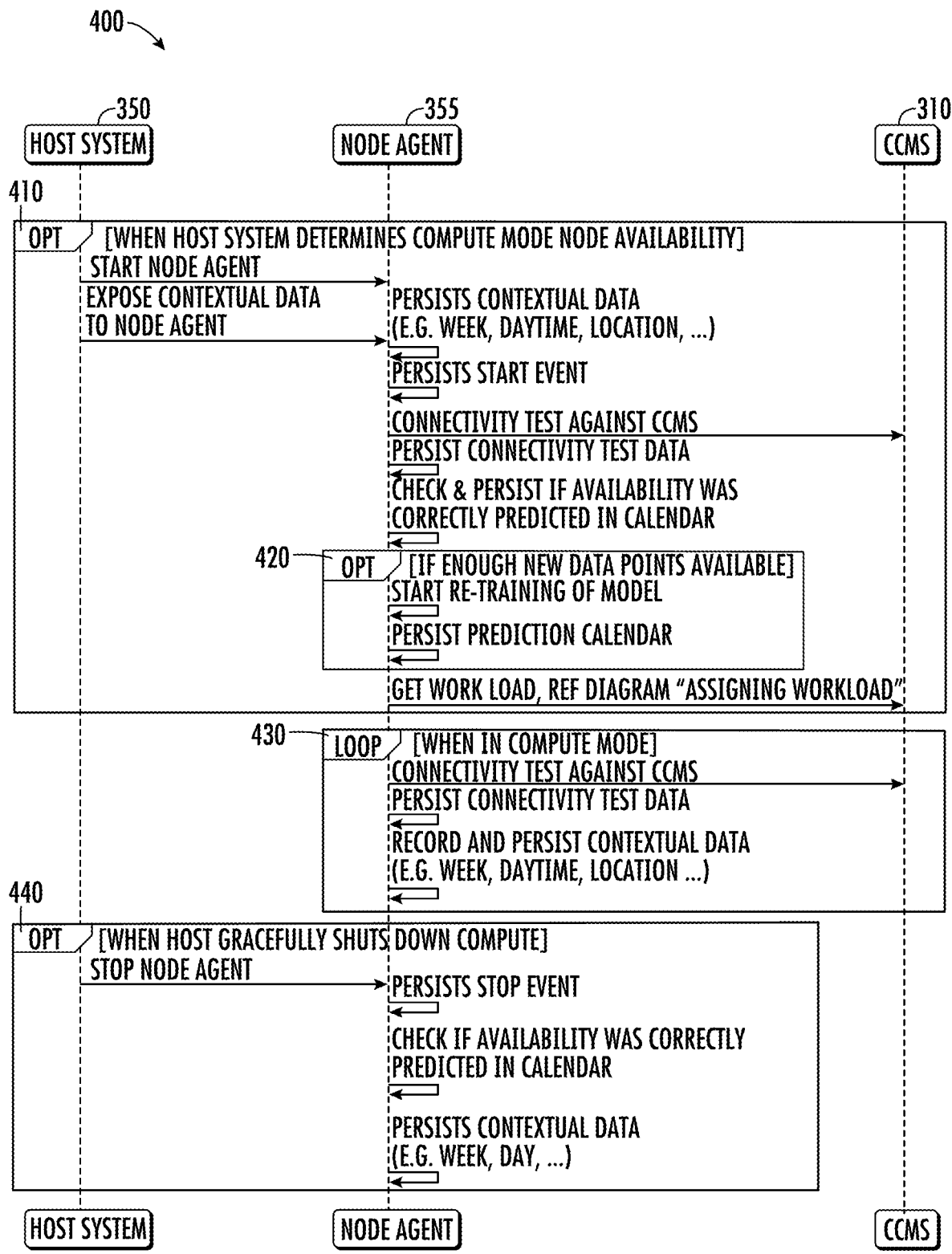
FIG. 4 illustrates a flowchart diagram of an example compute mode communication between a host system, a node agent, and a centralized compute management system according to example embodiments hereof.
Figure 5:
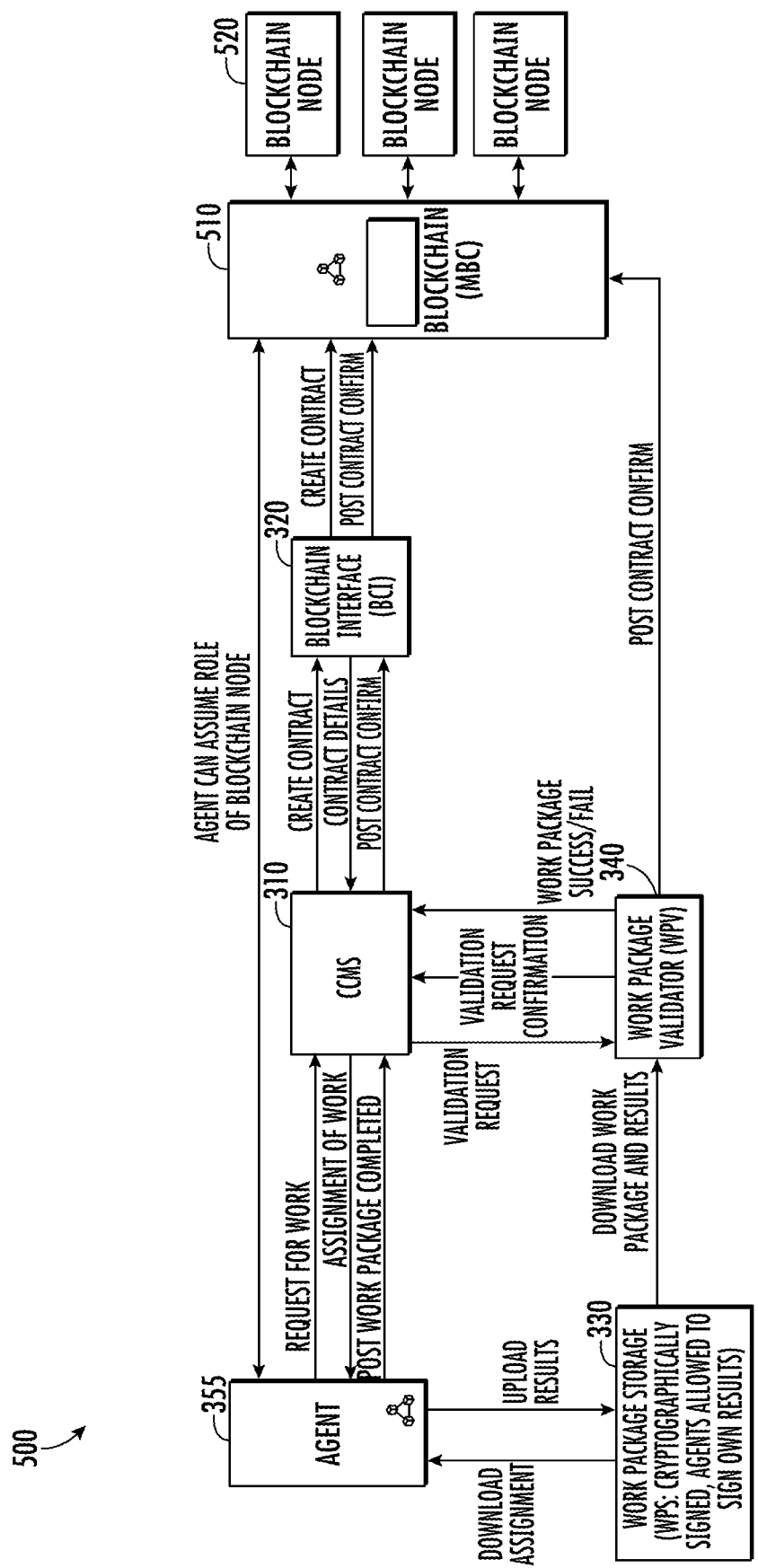
FIG. 5 illustrates a block diagram of an example centralized compute management system interacting with a plurality of node agents and a blockchain interface according to example embodiments hereof.

As will be further described herein with reference to FIGS. 4 and 5, the vehicle data 118 may include computing capabilities of each node agent and an availability calendar of each node agent. For example, the computing capabilities (e.g., computing capability data 129) of the first node agent 210 may be determined onboard (e.g., using the onboard computing system 130) the host system (e.g., vehicle) based on a performance analysis of one or more computing resources onboard the host system. The computing capabilities can be indicative of the types of computing hardware included in the first node agent 210, the performance (e.g., processing speed, latency) of the computing hardware, or other information about the computing resources of the first node agent 210.

The availability calendar can include the network availability calendar 126 and the compute mode availability calendar 128 of the first node agent 210 and may be determined onboard the host system (e.g., vehicle). As further described herein, the availability calendar can indicate a predicted network connectivity of the host system as well as when (and for how long) the computing capabilities of the first node agent 210 will may be available for performing a computing task. For example, the availability calendar can include a network availability calendar 126 that determines when the vehicle is able to transmit data over a network. Moreover, the availability calendar can include a compute mode availability calendar 128 that determines a specific time and a time duration that the vehicle is available to perform the computing task of the workload task payload (e.g., given its computing capabilities).

In response to receiving the vehicle data 118 from the first node agent 210, which enables the first node agent 210 to register with the CCMS 112, the CCMS 112 can generate a work package for the first node agent 210 based on the computing capabilities of the first node agent 210. The work package can be stored as work package data 131 as described in FIG. 1. The work package can include a computing task for the first node agent 210 (e.g., first vehicle, first electric vehicle) to complete using at least a portion of the computing resources onboard the host system or the first node agent 210.

Figure 6:
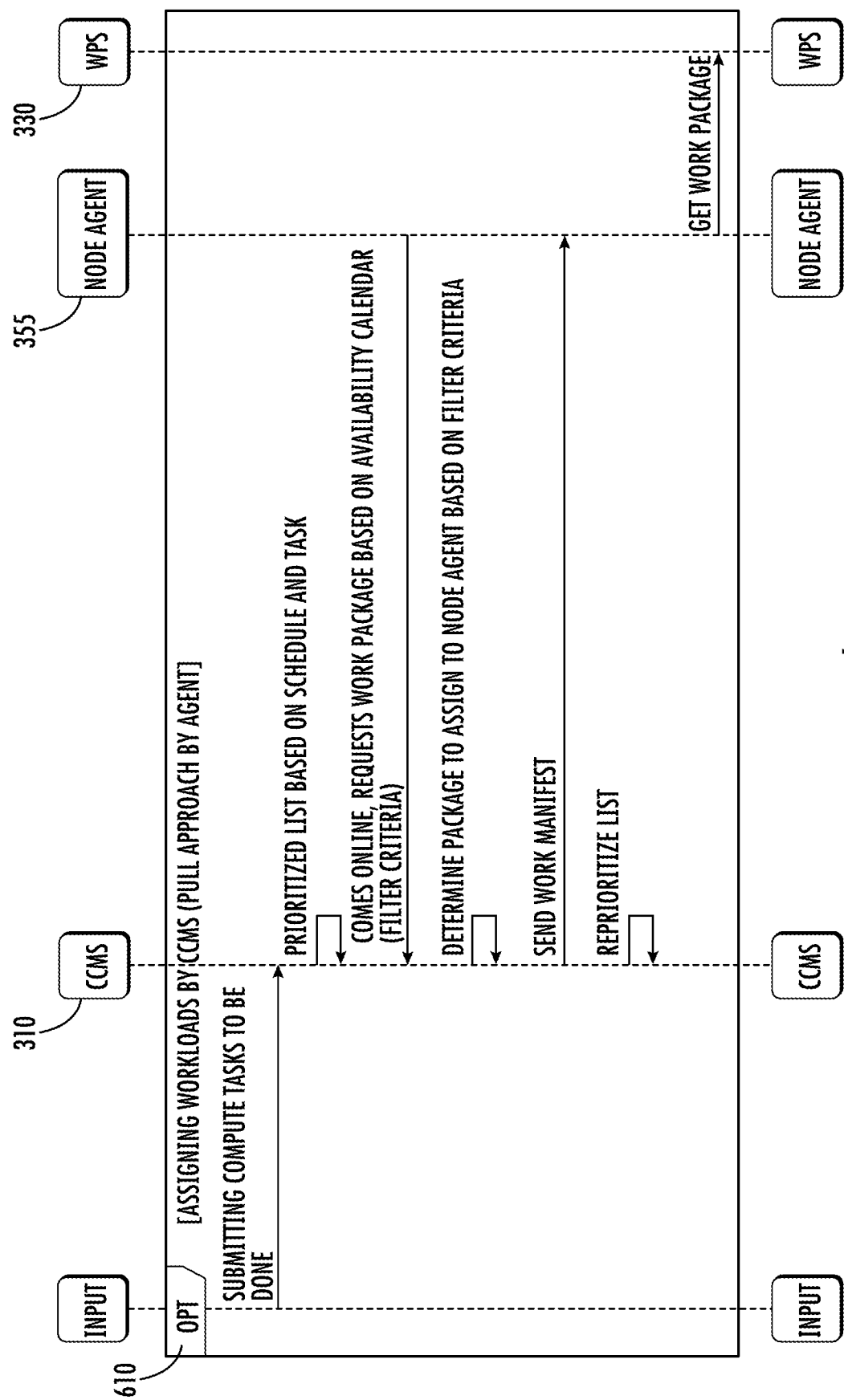
FIG. 6 illustrates a flowchart diagram of a centralized compute management system assigning a task to a node agent according to example embodiments hereof.

As will be further described herein with reference to FIGS. 5 and 6, the work package can indicate a computing task (e.g., data deduplication, image data processing, mapping updates, model training, data re-structuring, etc.) that has been specifically selected for the first node agent 210. The work package can indicate compute instructs for executing a computing task using the computing resources that are predicted to be available at the first node agent 210. For example, as further described herein, the work package may be generated based on the availability calendar and the computing capabilities of the first node agent to help improve reliability that the first node agent 210 will be available and able to complete the assigned computing task within an expected timeframe, with a certain accuracy, etc. In an embodiment, the work package may include instructions for transmitting data associated with the completed task (e.g., notification instructions, upload instructions, etc.).

In some instances, the CCMS 112 can generate a request to perform the computing task of the work package, instead of generating the work package. For example, the CCMS 112 can generate a request having a location of the work package (e.g., a reference or link to a computing storage resource where the work package can be accessed/retrieved). The then the CCMS 112 can transmit the request to the first node agent 210. Subsequently, the first node agent 210 can download the work package based on the location received from the request.

Furthermore, the CCMS 112 can determine, based on the availability calendar (e.g., network availability calendar 126), one or more transmission parameters for communicating the work package to the first node agent 210. The transmission parameters can include a time for transmitting the work package to the first vehicle (e.g., first electric vehicle). For example, the time for transmitting can be when the first node agent 210 is in the download mode (e.g., vehicle has internet connectivity and utilizing limited computing resources).

Subsequently, based on the transmission parameters, the CCMS 112 can transmit a request for the first node agent 210 to perform the computing task of the work package.

Additionally, the CCMS 112 can generate and assign a second work package to the second node agent 220 based on the computing capabilities of the second node agent 220. For example, the computing capabilities of the second node agent 220 can be less than the computing capabilities of the first node agent 210, thus the CCMS can assign a second work package that is easier than the first work package to perform.

Figure 3:
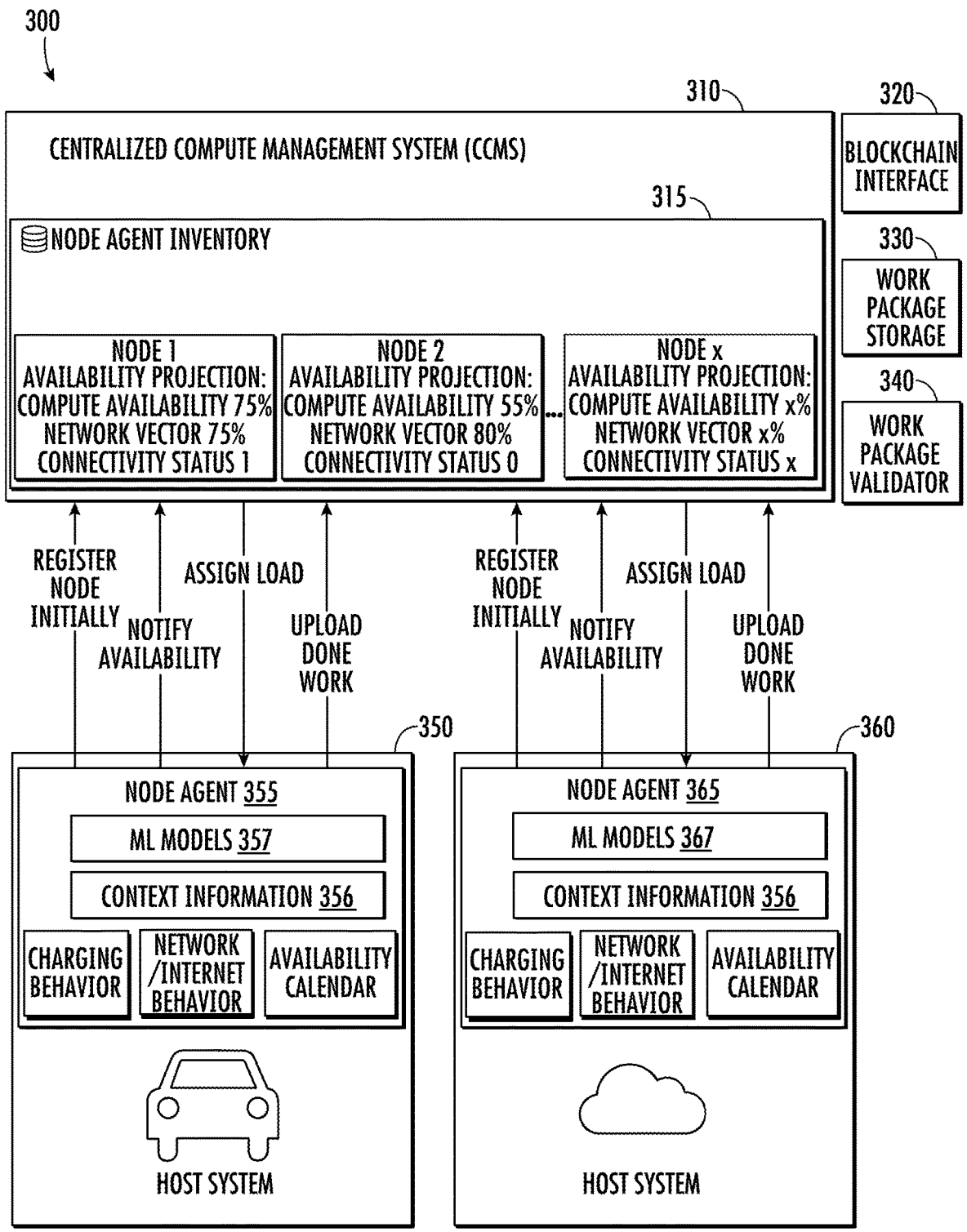
FIG. 3 illustrates a block diagram of computing components of a CCMS and respective node agents according to example embodiments hereof.

FIG. 3 illustrates a block diagram 300 of computing components of a CCMS and respective node agents according to example embodiments hereof. The block diagram 300 includes a CCMS 310, a blockchain interface 320, a work package storage 330, a work package validator 340, a first host system 350, and a second host system 360. The CCMS 310 can include a node agent inventory 315. The first host system 350 (e.g., first vehicle, first electric vehicle) can include a first node agent 355 (e.g., onboard computing system 130). The second host system 360 (e.g., second vehicle, second electric vehicle) can include a second node agent 365. In some embodiments, the CCMS 310 may include similar hardware, software, or functions as CCMS 112. In some embodiments, the first host system 350 may include similar hardware, software, or functions as the vehicle 105. In some embodiments, the first node agent 355 may include similar hardware, software, or functions as the onboard computing system 130.

The first and second node agents 350, 360 may collect context information 356, 366, respectively. The context information 356, 366 may include data that is relevant for learning the usage and connectivity patterns of the respective node agents. In an example, the first node agent 350 may acquire data indicative of the charging behavior of the first node agent 350 (e.g., as vehicle charging data 124). The first node agent 350 may also obtain data indicative of the network behavior associated with the first node 350. For example, the first node agent 350 can probe network connectivity state via speed tests (e.g., to CCMS 310) to help determine when and where the first node agent 350 is connected to the CCMS 310. In an embodiment, the first node agent 350 can determine the quality (e.g., signal strength) of the network connection.

The first node agent 350 may also acquire data indicative of the type, usage, and performance of the computing resources of the first node agent 350 (e.g., onboard a vehicle). This can include maintaining a data structure indicative of the computing hardware (e.g., CPUs, GPUs), their make/model, lifetime, etc. This can also include keeping statistics over the activation of different agent modes. Each node agent can regularly conduct a self-assessment of its compute capabilities by running standardized performance benchmarks on available hardware (e.g., GPU, CPU, ML accelerators), which can be stored as computing capability data (e.g., computing capability data 129).

According to some embodiments, the first node agent 355 of the first host system 350 (e.g., IoT device, vehicle) can have a plurality of states, such as a download mode, a compute mode, or an off mode. In some instances, the first host system 350 can have a plurality of node agents.

During the download mode, the first host system 350 or the first node agent 355 can have internet connectivity and utilize limited (e.g., less than 10%) computing resources to perform a task (e.g., to download data) of the download mode. Additionally, the download mode can be terminated and restarted by the first host system 350 or the first node agent 355 without issues. By requiring limited computing resources, the download mode can operate even when the first host system 350 is being utilized for its primary purpose, such as when a vehicle is being driven and requires the compute resources for driving purposes.

The compute node may require utilization of a larger share (e.g., greater than 50%) of the computing resources of the first node agent 355 to perform a task (e.g., a computing task of a work package) of the compute mode. In some instances, the compute mode can be intended to be performed when the first host system 350 or first node agent 355 determines that the main functions of the system are not required (e.g., when the vehicle is actively charging). In the compute mode, the first node agent 355 can isolate the general compute environment from the rest of the first host system 350 through virtualization. Additionally, the first node agent 355 can enable access to the hardware (e.g., GPU, CPU, ML accelerators) of the first host system 350 to perform a task. Moreover, the first node agent 355 can be controlled and scheduled by the first host system 350.

The off mode may occur when the vehicle is not connected to the network. Additionally, the off mode may occur when the vehicle is completely shut down. Moreover, the off mode may occur when the battery level of the vehicle is below a predetermined threshold.

In some instances, the context information 356, 366 may include user specific data. The first host system 350 can provide to the first node agent 355 access to user specific data (e.g., context data, vehicle data 118) of the host system. User specific data can include data that may be relevant for learning usage patterns of the first host system 350. This can include, for example, information such as the user's specific location history, charging locations, charging dates, charging times, or other information The first node agent 355 can include, employ, or otherwise leverage machine-learning (ML) models 357. The machine-learned models 357 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

In some instances, the ML models 357 can be configured to determine the availability and probability of the different modes of the first host system 350. For example, the first node agent 355 can input the context information 356 into the ML models 357 to determine the probability or the availability of each mode during different periods of time in the future. By having access to the provided context information 356 (e.g., including vehicle data 118) from the first host system 350, probing the network connectivity state via speed test to the CCMS 310, and keeping statistics over the activation of the different modes, the first node agent 355 can utilize the ML models 357 to determine the availability and probability of the different modes from historic data to generate a quantized calendar. The quantized calendar can predict the state of the first node agent 355 (e.g., off, download or compute mode) and the network status at a certain point in the future, as further described with respect to FIG. 4.

The ML models 357 can be trained using training context data. The training context data can include context information indicative of network availability data, charging data, location data, etc. The training context data can include labelled training data. The training context information can be feed into the ML models 357, processed by the ML models 357, and compared to a ground truth. This may occur the first node agent 355 or at a remote computing system, as further described herein. The training of the ML models 357 can include various training or learning techniques, such as, for example, backwards propagation of errors. For example, a loss function can be backpropagated through the model(s) to update one or more parameters of the model(s) (e.g., based on a gradient of the loss function).

In some instances, the network status may be utilized by the CCMS 310 to determine, based on the availability calendar of the first node agent 355, one or more transmission parameters. The CCMS 310 may transmit a request to perform a task to the first host system 350 based on the transmission parameters. The transmission parameters may be indicative of a time (e.g., weekday, time of day, etc.) or a location of the vehicle at which the CCMS 310 may request the first node agent 355 to complete a computing task. In some instances, the transmission parameters may indicate a mode of the first node agent 355. In some instances, the transmission parameters may include a future scheduled time for transmitting a request for the first node agent 355 to complete the computing task.

In order to safeguard user specific data (e.g., Personal Identifiable Information (PII), context data, private data), in an embodiment, the learning process to train the ML models 257 can be solely performed on the first node agent 355 in order to prevent the user specific data from being transmit out of the first host system 350. The techniques described herein enable the first host system 350 to provide user specific data to the first node agent 355 to improve the accuracy of the probability and availability determination without the privacy implication of a centralized approach (e.g., without transmitting user specific data to the computing platform 110 or CCMS 310). In some instances, the first node agent 355 only shares an availability calendar and performance benchmarks with the CCMS 310. Additionally, the first node agent 355 only shares a prediction availability calendar and performance benchmarks with the CCMS 310. Additionally, each node agent can regularly conduct a self-assessment of its compute capabilities by running standardized performance benchmarks on available hardware (e.g., GPU, CPU, ML accelerators), which can be stored as computing capability data (e.g., computing capability data 129).

The node agent inventory 315 may include a data structure that indicates the one or more node agents that are registered with the CCMS 310. The data structure of the node agent inventory 315 may include a list, table, etc. According to some embodiments, a node agent (first node agent 355, second node agent 360) may register itself with the CCMS 310 by transmitting to the CCMS 310 its computing capabilities (e.g., prior assessed benchmark results of the node agent) and a predictability calendar of the node agent. Once a node agent is registered, the CCMS 310 may store the node agent data in the node agent inventory 315. After the node agent is registered, the node agent may be selected for a task assignment. In an embodiment, the node agent may wait for a task assignment (e.g., request to perform a task of a work package) from the CCMS 310.

The work package storage 330 can be a system containing self-contained and finite compute instructions with all required data and compute instructions to complete a computing task. A computing task can also include metadata which describe the compute task and its requirements in more detail, such as required hardware, optional end date, effort of the task. A work package validator 340 can verify whether a compute task has been completed successfully by the node agent 350. This result can then be used for the creation of the smart contract and ensures the origin authenticity as well as data integrity. An interface, such as the blockchain interface 320, can communicate with a shared, immutable record of smart contracts, similar but not limited to a blockchain 510.

The work package validator 340 may validate that a work package has been completed by a node agent. For example, the work package validator 340 may send a validation message to the CCMS 310 that the first node agent 355 has successfully performed a computing task of an assigned work package.

The blockchain interface 320 may be an interface to communicate with the CCMS 310 to generate a smart contract associated with a reward for performing a computing task. In other embodiments, the CCMS 320 may interface with a non-blockchain interface that enables the generation of a contract associated with a reward for performing a computing task.

In an embodiment, a reward can be provided to the node agent for performing a computing task. The CCMS 310 can interact with the work package validator 340, which can validate that the computing task has successfully been performed. Subsequently, the CCMS 310 can interact with the blockchain interface 330 to generate a smart contract for the node agent. The smart contract can be associated with the reward for the node agent. For example, the reward can be a monetary compensation for successfully performing the computing task. In another example, the reward can be additional benefits (e.g., free/reduced-fee vehicle charging) received from the vehicle's manufacturer.

Agent Application

FIG. 4 illustrates a flowchart diagram 400 of an example compute mode communication between the first host system 350, the first node agent 355, and the CCMS 310 according to example embodiments hereof. The FIG. 4 includes a plurality of operations 410, 420, 430, 440, each of which may include sub-operations or steps (shown in FIG. 4) that may be performed by the host system 350.

At operation 410, the host system 350 can determine the availability calendar (e.g., compute mode availability calendar 128). In some instances, the first node agent 355 can collect data (e.g., vehicle data 118) to generate an availability calendar. For example, the first node agent 355 may obtain (and store) contextual information 356, which may include vehicle data 118, associated times (e.g., week, weekdays, daytime), and associated locations (e.g., latitude/longitude coordinates, addresses). The first node agent 355 may also perform connectivity tests with the network (e.g., through which it has established a communication channel to the CCMS 310). The connectivity tests may include network speed tests that indicate whether the first node agent 335 is able to connect/transmit data over the network or the quality of the connection. The information collected by the first node agent may be persisted within a memory of the first node agent 355 (e.g., as vehicle data 118).

The first node agent 355 may determine the availability calendar using the collected data. For example, the first node agent 355 may process the gathered data (e.g., vehicle data 118) to predict when and where the first node agent 355 will be connected to a network associated with the CCMS 310. The first node agent 355 may utilize such data to determine which (and what portion) of the node agent's computing resources (e.g., processors, memory, power, bandwidth) will be available during certain timeframes. The first node agent 355 may also determine how long such resources will be available for completing a computing task. The first node agent 355 may also predict when, where, and for how long the first node gent 355 may be in a certain mode (e.g., download mode, compute mode, off mode). For example, the vehicle data 118 can be inputted into the ML models 357 to generate the availability calendar. The availability calendar can include the compute mode availability calendar 128 and the network availability calendar 126. The compute mode availability calendar 128 and the network availability calendar 126 may be combined into a single data structure or separated in different data structures.

As described herein, the availability calendar may be or otherwise include a quantized calendar predicting a current state of the first node agent 355 and a state at a future period. Table 1 below provides an example quantized calendar.

TABLE 1

Depiction of the "Quantized Prediction Calendar" with an example quantization of 15 minutes

| | Day +1 | Day +2 | Day +3 | Day +4 | ... |
|---|---|---|---|---|---|
| 00:00am-00:15am | Compute availability prediction: 99% Network prediction: Status: 99% connected Speed: 99% faster than | Compute availability prediction: 99% Network prediction: Status: 99% connected Speed: 99% faster than | Compute availability prediction: 99% Network prediction: Status: 99% connected Speed: 99% faster than | Compute availability prediction: 50% Network prediction: Status: 50% connected Speed: 99% faster than | |

TABLE 1-continued

Depiction of the "Quantized Prediction Calendar" with an example quantization of 15 minutes

|  | Day +1 | Day +2 | Day +3 | Day +4 | ... |
|---|---|---|---|---|---|
| 00:15am-00:30am | 10 Mbit/s Compute availability prediction: 99% Network prediction: Status: 99% connected Speed: 99% faster than 10 Mbit/s | 10 Mbit/s Compute availability prediction: 99% Network prediction: Status: 99% connected Speed: 99% faster than 10 Mbit/s | 10 Mbit/s Compute availability prediction: 99% Network prediction: Status: 99% connected Speed: 99% faster than 10 Mbit/s | 10 Mbit/s Compute availability prediction: 50% Network prediction: Status: 50% connected Speed: 99% faster than 10 Mbit/s | |
| 00:30am-00:45am | Compute availability prediction: 50% Network prediction: Status: 1% connected Speed: 10% faster than 5 Mbit/s | Compute availability prediction: 50% Network prediction: Status: 1% connected Speed: 10% faster than 5 Mbit/s | Compute availability prediction: 50% Network prediction: Status: 1% connected Speed: 10% faster than 5 Mbit/s | Compute availability prediction: 1% Network prediction: Status: 1% connected Speed 10% faster than 5 Mbit/s | |

In some instances, the first node agent 355 may assess the network availability calendar. For example, at a future timeframe identified in the availability calendar (e.g., Day+1 the first node agent 355 may obtain data to determine whether the compute availability prediction (e.g., 50%) and network prediction (e.g., status: 1% connected, speed: 10% faster than 5 Mbit/s) included in the availability calendar are similar (e.g., within a 5% range) to the actual state of the first node agent 355. If so, the first node agent 355 may persist the availability calendar. If not, the first node agent 355 may revise the availability calendar or refine its predictions by gathering updated data associated with the first node agent 355.

At operation 420, when the vehicle data (e.g., vehicle data 118) has been updated (e.g., the number of updated data points exceeds a predetermined threshold), the host system 350 can recalculate the availability calendar. For example, when a threshold number (e.g., 10) of data points of the vehicle data 118 has changed, then the first node agent 355 can retrain the ML models 357 based on the updated vehicle data 118. In some instances, an additional layer may be added to the ML models 357.

The first node agent 355 can periodically (e.g., hourly, daily, weekly) input updated vehicle data into the ML models 357 to generate an updated availability calendar. When the updated availability calendar is different than the previously transmitted availability calendar, then the updated availability calendar is transmitted to the CCMS 310. Moreover, when a threshold in change of probability associated with the availability calendar is reached, the availability calendar can be uploaded again to the CCMS 310. For example, when the machine-learned model determines that there is a 95% confidence that the vehicle is available for compute mode during a first period of time, then the compute mode availability calendar is updated to include the first period of time. The updated compute mode availability calendar can then be updated to the CCMS 310. Furthermore, the ML models 357 can have a self-learning or self-supervised techniques based on vehicle data 118, charging patterns, and network vectors (e.g., network state, network connectivity prediction, network speed prediction). The network vector can include data associated with the network state, connectivity prediction, and/or speed prediction. As previously mentioned, private data (e.g., user specific data, vehicle specific data, PII) may be processed at the first node agent 355 to protect the privacy of the users.

At operation 430, when the first node agent 355 is in compute mode, the first node agent 355 can communicate with the CCMS 310. For example, the first node agent 355 can test (or re-test) the network connectivity between the first node agent 355 and the CCMS 310 using one or more network testing diagnostic tools to test the speed, quality, etc. of the connection between the first node agent 355 and the CCMS 310. The first node agent 355 can persist the updated connectivity test data. In some instances, the first node agent 355 can obtain updated contextual information (e.g., vehicle data 118). As further described herein, during the compute mode, the first node agent 355 can perform a task associated with a request received from the CCMS 310.

At operation 440, the first host system 350 can shut down the compute mode by sending a stop notification to the first node agent. For example, when the first host system 350 is being utilized by a user to drive to a location, the first host system 350 can shut down the compute mode so that the computing resources of the first host system 350 are utilized for driving purposes. In some instances, the first node agent 355 can assess (or re-assess) the availability calendar using similar techniques to those already described herein.

Centralized Compute Management System (CCMS)

FIG. 5 illustrates a block diagram of an example centralized compute management system ecosystem 500 according to example embodiments hereof. FIG. 5 also illustrates the example data flow between the systems of ecosystem 500.

The ecosystem 500 can include a plurality of sub-systems, such as a CCMS 310, a work package storage 330, a work package validator 340, and a block interface 320. As described in FIG. 3, the CCMS 310 can include a node agent inventory 315. The node agent inventory 315 (not pictured in FIG. 5) may store node agent data associated with each registered node agent. Each node agent 350 may register with the CCMS 310 to be considered for the assignment of work package.

The node agents communicate with the node agent inventory to upload their predictability calendar and the network calendar (e.g., the network vector).

The CCMS 310 may initiate a work package (e.g., workload) assignment to one or more node agents (e.g., first node agent 355) that has registered with the CCMS 310. As previously mentioned, the first node agent 355 may transmit its computing capabilities and availability calendar to the CCMS 310. The network connectivity (e.g., network vector) of the first node agent 355 may be assessed by the CCMS 310 when the first node agent 355 connects to the CCMS 310. In some instances, once the CCMS 310 has registered one or more agents in the node agent inventory, the assignment of tasks may be performed.

The CCMS 310 can prepare and assign a work package (e.g., workload) to a node agent 355 based on its capabilities. The work package can be based on the availability calendar and computing capabilities of the first node agent 355. In an example, the computing capabilities of the first node agent 355 may include multiple GPUs. The availability calendar may indicate, for example, that at future time (e.g., when the first node agent 355 in a compute mode), 99% of the GPUs are available for completing a computing task for 2.5 hours and that the first node agent 355 is available to receive (and transmit) communications across a network to the CCMS 310. The CCMS 310 can identify a computing task (e.g., automated data labelling) that can be completed by the first node agent 355 with these computing resources and within this timeframe. The CCMS may generate a work package indicative of compute instructions for completing this computing task. The CCMS 310 may assign the work package to the first node agent 355. The work package (e.g., workload) assignment process is further described in FIGS. 6 and 7.

In response to the first node agent 355 receiving the work package data (e.g., work package data 131) from the CCMS 310, the first node agent 355 can download the work package from the work package storage 330. The work package data can include a cryptographic signature and location of work package. Once the work package is downloaded, the first node agent 355 can process the one or more tasks associated with the work package.

The first node agent 355 may upload the processed result to the work package storage 330. The first node agent 355 may notify the CCMS 310 of task completion. For example, the first node agent 355 may transmit a notification to the CCMS 310 at a current time or at a later time (e.g., when the first node agent 355 has network connectivity if it does not in the current time).

In an embodiment, the CCMS 310 may coordinate (e.g., request) the creation of a smart contract which may be cryptographically signed to ensure origin authenticity as well as data integrity. The CCMS 310 may send the request to a blockchain interface 320 to establish a smart contract. Additionally, the blockchain interface 320 may maintain an inventory of the smart contracts and the performed tasks by the different node agents.

The smart contract can be cryptographically signed using a blockchain 510. By cryptographically signing using a blockchain 510, a digital signature is created using a cryptographic algorithm and then recorded on a blockchain node 520. This process ensures the authenticity and integrity of the signed data. When a digital signature is created using a cryptographic algorithm, it produces a unique code that may only be created by the owner (e.g., CCMS 310, blockchain interface 320) of the private key associated with the signature. This ensures that the signature may only be created by an authorized entity (e.g., CCMS 310, blockchain interface 320) and cannot be forged. By combining the digital signature with the blockchain 510, the signature may be recorded in a blockchain node 520 in a tamper-proof way.

After the smart contract is established, the blockchain interface 320 may transmit information associated with the smart contract back to the CCMS 310. To verify the performed work, the CCMS 310 may request the validation from the work package validator 340. For example, the work package validator 340 may send work package validation data 133 to the CCMS 310. The work package validator 340 may download the work package and results from the work package storage 330 and may determine whether the processing was successful. The work package validator 340 can determine if the computing task has been successfully performed based on a completion notification that is received once the computing task is finalized. Additionally, if the computing task is not performed within a predetermined amount of time, then the work package validator 340 may indicate that the computing task is not successfully performed. The result of the validation request may be forwarded to the CCMS 310. The CCMS can notify the blockchain interface 510 with the updated information for the smart contract. In case of a failed validation request, the CCMS 310 assumes the work package (e.g., workload) has not been processed to satisfaction and reassigns it to another agent (e.g., second node agent 360).

FIG. 6 illustrates a flowchart diagram 600 of a CCMS assigning a task to a node agent according to example embodiments hereof.

At operation 610, the CCMS 310 can assign a work package to the first node agent 355. Each work package can be finite and self-contained. Additionally, the CCMS 310 can ensure that tasks are appropriately sized to ensure agents can complete it within a given compute mode time limit. Therefore, the CCMS 310 can baseline tasks, so that only feasible tasks (in terms of time and processing capabilities) are assigned to node agents.

As described herein, the work package can be generated based on the availability calendar and the computing capabilities of the first node agent 355. For example, the computing capabilities can indicate that the first node agent 355 includes several CPUs (e.g., onboard a vehicle). The availability calendar can indicate that the first node agent 355 will be in a compute mode at a certain future time period and for a length 5 hours during which 95% of the CPUs will be available to process a computing task. The CCMS 310 can select a computing task (e.g., image processing) for the first node agent 355 that it can complete based on these computing capabilities and their availability. The CCMS 310 can generate a work package indicative of the computing task (e.g., with compute instructions associated therewith). Based on the availability calendar, the CCMS 310 can determine transmission parameters that indicate the timing for transmitting a request for the first node agent 355 to complete the work package and transmit the request accordingly.

The first node agent 355 can get the work package from the work package storage 330. Once the work package is downloaded by the first node agent 355, the tasks of the work package can be performed during the compute mode of the first node agent 355.

The CCMS 310 can access the node agent inventory 315 to obtain a list of registered node agents. The node agent inventory 315 can have a plurality of lists for the CCMS 310 to select from. For example, the node agent inventory 315 can have a first list associated with high processing power node agents and a second list with low processing power node agents. Moreover, each computing task can be labeled, such as a high priority task, a medium priority task, and a low priority task. The CCMS 310 can assign a computing task to a registered node agent based on the labels associated with the computing task, and the different characteristics of the node agent (e.g., high processing power, high reliability, good network connection).

By way of example, the CCMS 310 can assign a high priority task first, a medium priority task second, and finally a low priority last. The priority can be indicative of the urgency with which the CCMS 310 desires to have the computing task completed. Additionally, the CCMS can assign a first task that requires high processing power to a first node with a high processing power capability, and a second task that requires low processing power to a second node with either a high processing power capability or a low processing power capability.

In some instances, the assignment does not require active node agents, but the CCMS 310 can take advantage of currently connected node agents so that there is no waiting period for assigning a work package. The determination of wherein a node agent is currently connected can be based on the availability calendar.

The CCMS can assign different levels of task priorities to the respective node agents (e.g. can be assigned to nodes that are currently connected, have good track records, and have faster processing speed). This may allow the CCMS 310 to determine which node agents are reliable and increase the likelihood of assigning a task to node agents with a positive record of completing computing tasks. In some instances, the node agents may be assigned different task priorities based on the respective node agent's reliability. For example, the first node can have a high reliability score and be assigned a high priority task, while the second node can have a low reliability score and be assigned a low priority task.

In an embodiment, the CCMS 310 can rebalance already assigned tasks. For example, the CCMS 310 may have already assigned a first computing task to the first node agent 355 and a second computing task to second node agent 365. The CCMS 310 may determine that a third computing task is of higher priority than the first and second tasks. The CCMS 310 may determine that the third computing task requires a significant amount of computing resources, which may only be available on the second node agent at the within the desired timeframe for completion. The CCMS 310 may determine that the second task may be completed by the computing resources of the first node agent and that the first computing task may be completed by the computing resources of a third node agent. Accordingly, the CCMS 310 may rebalance the computing tasks by re-assigning the first computing task to the third node agent, the second computing task to the first node agent, and the third computing task to the second node agent. This can permit the first, second, and third computing tasks to be completed in a reliable, timely, and efficient manner.

Example Methods

The following flow diagrams include operations that are executable by computing system(s). Operations described as being performed by a certain computing system in the example described herein are not meant to be limiting and may be performed by another computing system. For example, operations described as being performed onboard a vehicle may be performed by a computing system that is remote from the vehicle, or vice versa.

Figure 7:
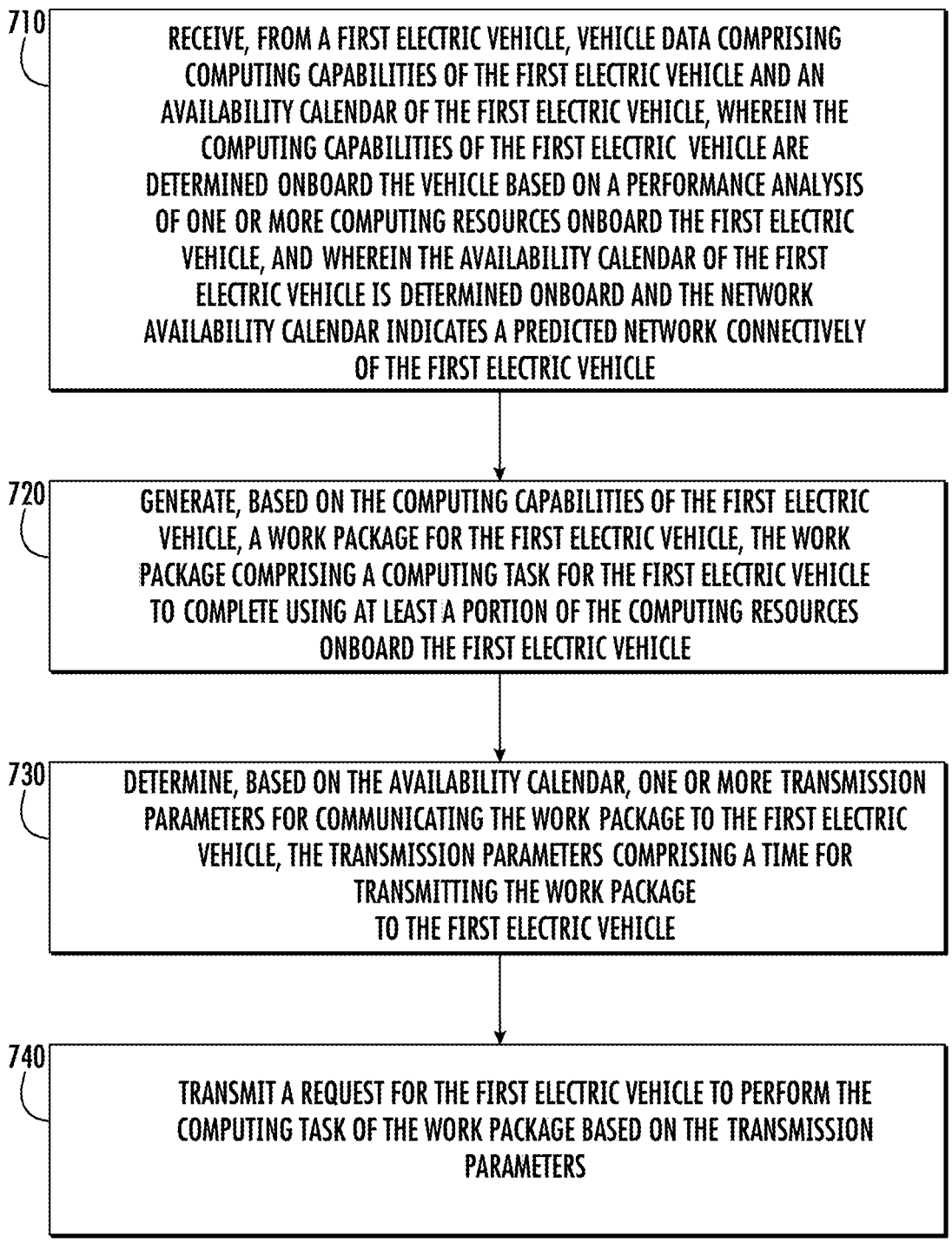
FIG. 7 illustrates a flowchart diagram of an example method for a centralized compute management system to allocate a computing task according to example embodiments hereof.

FIG. 7 depicts a flow diagram that illustrates a method 700 for CCMS to transmit a request to a node agent to perform a computing task. In an embodiment, the method 700 may be performed by a CCMS, such as the CCMS 112, the CCMS 310, the control circuit 915 of FIG. 9, or other suitable control circuit. One or more portions of the method 700 may be implemented as an algorithm on the hardware components of the devices described herein. For example, the steps of method 700 may be implemented as operations/instructions that are executable by computing hardware.

Although FIG. 7 depicts steps performed in a particular order for purposes of illustration and discussion, the methods of the present disclosure are not limited to the particularly illustrated order or arrangement. The various steps of the method 700 may be omitted, rearranged, combined, or adapted in various ways without deviating from the scope of the present disclosure.

Method 700 includes an electric vehicle serving as a node agent for example purposes only and is not meant to be limiting. As described herein, it is to be understood that other vehicles or IoT devices can be utilized within method 700 instead of an electric vehicle.

In an embodiment, the method 700 may begin with or otherwise include a step 710, in which the computing system (e.g., CCMS 112, CCMS 310) receives, from a first electric vehicle (e.g., vehicle 105, first node agent 210, first host system 350), vehicle data including computing capabilities of the first electric vehicle and an availability calendar of the first electric vehicle. The computing capabilities (e.g., computing capability data 129) of the first electric vehicle can be determined onboard the vehicle based on a performance analysis of one or more computing resources onboard the first electric vehicle. Additionally, the availability calendar (e.g., network availability calendar 126, compute mode availability calendar 128) of the first electric vehicle can be determined onboard the vehicle and the availability calendar can indicate a predicted network connectivity of the first electric vehicle.

According to some embodiments, some electric vehicle (e.g., first electric vehicle) may operate solely on batteries, while other electric vehicles may be hybrid models with both an electric motor and an internal combustion engine. In some instances, an electric vehicle (e.g., first electric vehicle) can be a battery electric vehicle (BEV), a plug-in hybrid electric vehicle (PHEV), a hybrid electric vehicle (HEV), or a fuel cell electric vehicle (FCEV). The BEV runs on electricity only and is recharged from an external power source. The BEV is propelled by one or more electric motors powered by rechargeable battery packs. The PHEV use batteries to power an electric motor and can be recharged from an external power source. Additionally, the PHEV incorporates an internal combustion engine that can recharge the battery or directly power the wheels to allow for longer driving ranges. The HEV is powered by a combination of an internal combustion engine with electric motors running off a battery pack for greater efficiency. The batteries of an HEV cannot be recharged from an external source. The FCEV use a highly efficient electrochemical process to convert hydrogen into electricity, which powers an electric motor.

As an illustrative example, vehicle 105 can determine an availability calendar based on the user specific data. The availability calendar may include a network availability calendar 126 and a compute mode availability calendar 128. Then the vehicle 105 may transmit the vehicle data 118, which includes the availability calendar and the computing capability data 129, to the CCMS 112 as part of registering as a node agent.

In some instances, the first electric vehicle may be an electric vehicle. The system may generate an electronic reward for a user of the first electric vehicle based on a completion of the computing task and a contribution to a reduction in greenhouse gas emissions. For example, the reward may be a renewable energy credit that is generating with a smart contract. The renewable energy credit (REC) may be a certificate corresponding to the environmental attributes of energy produced from renewable sources or reduced energy consumption using modern, more-efficient onboard computing systems. The renewable energy credits can track progress towards and compliance with government's renewable portfolio standards that are meant to support a cleaner generation mix.

In some instances, the reward may be based on the contribution of the first node agent in reducing greenhouse gas emissions/mitigating climate change. By way of example, the first node agent may be an electric vehicle. The reward may be a monetary or other credit award. The reward can be increased based on the aggregate number of computing tasks that have been completed by the electric vehicle, the lifetime of use of the electric vehicle, etc. The more computing tasks completed or the more the electric vehicle is used by the user, the higher the reward (e.g., the higher the number of credits for electric charging). Additionally, or alternatively, the reward can be based on a recent transition of the user from a combustion-engine vehicle to an electric vehicle, etc. For example, a user may have recently acquired an electric vehicle after having a combustible-engine vehicle. The reward for the first computing task completed by this electric vehicle may be higher to encourage the utilization of electric vehicles.

The CCMS 310 can provide data indicative of a reward (e.g., an award) to a profile of a user of the first node agent. This can include, for example, depositing a monetary reward to credit to an account associated with the user's database. In some instance, this may include utilizing certain banking APIS to transmit data indicative of the reward, for reflection in the user's bank account.

In some instances, the system can register, in an agent inventory, the first electric vehicle as a node agent. The agent inventory can have a list of node agents. Additionally, each node agent in the list of node agents can include an associated availability calendar.

In some instances, the availability calendar can be determined by the first electric vehicle using one or more machine-learned models based on a network connection vector of the first electric vehicle or the compute availability of the first electric vehicle. Additionally, the availability calendar can include a plurality of locations, and the network connection vector of the first electric vehicle can be indicative of a network connection of the first electric vehicle in each location of the plurality locations. Moreover, the network connection vector of the first electric vehicle can be determined by performing a network connectivity speed test with the first electric vehicle.

In an embodiment, the method 700 may begin with or otherwise include a step 720, in which the computing system generates, based on the computing capabilities of the first electric vehicle, a work package for the first electric vehicle. The work package (e.g., work package data 131) can include a computing task for the first electric vehicle to complete using at least a portion of the computing resources onboard the first electric vehicle.

Continuing with the illustrative example, the CCMS 112 may generate a work package so that a computing task (e.g., performing a non-driving computing task) can be completed by the onboard computing system 130 when the vehicle 105 is in the compute mode (e.g., charging). The compute mode may be identified in the compute mode availability calendar 129. For example, the vehicle 105 can be predicted to be in compute mode at night during the weekdays when the vehicle is charging at the user's home.

In some instances, the work package can be indicative of at least one of: a minimum computing resources requirement, a completion date, and an effort level for performing the workload task.

In an embodiment, the method 700 may begin with or otherwise include a step 730, in which the computing system determines, based on the availability calendar, one or more transmission parameters for communicating the work package to the first electric vehicle. The transmission parameters can include a time for transmitting the work package to the first electric vehicle. For example, the availability calendar can include a network availability calendar (network availability calendar 126) that determines when the vehicle is able to transmit data over a network. The transmission parameters can be determined based on the network availability calendar 126.

Continuing with the illustrative example, the CCMS 112 may determine based on the network availability calendar 129 that the time for transmitting the work package to the vehicle 105 is during the user's commute to work. Thus the transmission parameters may include a time frame (e.g., 8 AM to 8:30 AM) associated with the user's morning commute.

In some instances, the availability calendar received at 710 can be a quantized calendar predicting a current state of the first electric vehicle and an operation state at a period in the future. For example, the operation state of the first electric vehicle can be either an off state, a download state, or a compute state. The CCMS 310 can determine the transmission parameters based on the predicted download state of the node agent 355.

In some instances, the availability calendar may be further determined based on user specific data that is only processed onboard the vehicle using the onboard computing system (e.g., onboard computing system 130). For example, the onboard computing system may utilize data sources that include personal identifiable information (PII) but such information is removed during generation of the availability calendar. This can allow the onboard computing system to transmit the availability calendar, while still protecting user specific data in its secure computing resources onboard the vehicle.

In an embodiment, the method 700 may begin with or otherwise include a step 740, in which the computing system, based on the transmission parameters, transmit a request for the first electric vehicle to perform the computing task of the work package. In some instances, the request can include a cryptographic signature and a location of the work package. Additionally, the work package can be stored in a work package storage. Moreover, the work package storage can have compute instructions and data for performing the computing task.

Continuing with the illustrative example, the CCMS 112 can transmit the request to the vehicle 105 during the user's morning commute. The request may include work package data 131, which includes a location of the assigned work package in the work package storage 330.

In some instances, the availability calendar received at 710 can include a compute mode availability calendar (e.g., compute mode availability calendar 128) that determines a specific time and a time duration that the vehicle is available to perform the computing task of the workload task payload.

In some instances, the computing task can be performed by the first electric vehicle only during the compute state. Moreover, the first electric vehicle can be restricted from performing the computing task during the download state.

In some instances, the system can receive, from a work validator, a confirmation that the work package or computing task has been performed. Additionally, the system can generate a smart contract associated with the work package. The smart contract can include the cryptographic signature and code indicative of an indication by the first electric vehicle that the first electric vehicle will perform the computing task. Moreover, the system can transmit the smart contract to a blockchain interface. The blockchain interface can maintain a performance status (e.g., task is assigned, task is being performed, task is completed, task is being reassigned) of the computing task.

In some instances, the system can determine that the computing task has not been performed by the first electric vehicle within a predetermined amount of time. Additionally, the system can assign, based on the determination that the computing task has not been performed by the first electric vehicle within the predetermined amount of time, the work package to be performed by a second vehicle.

Figure 8:
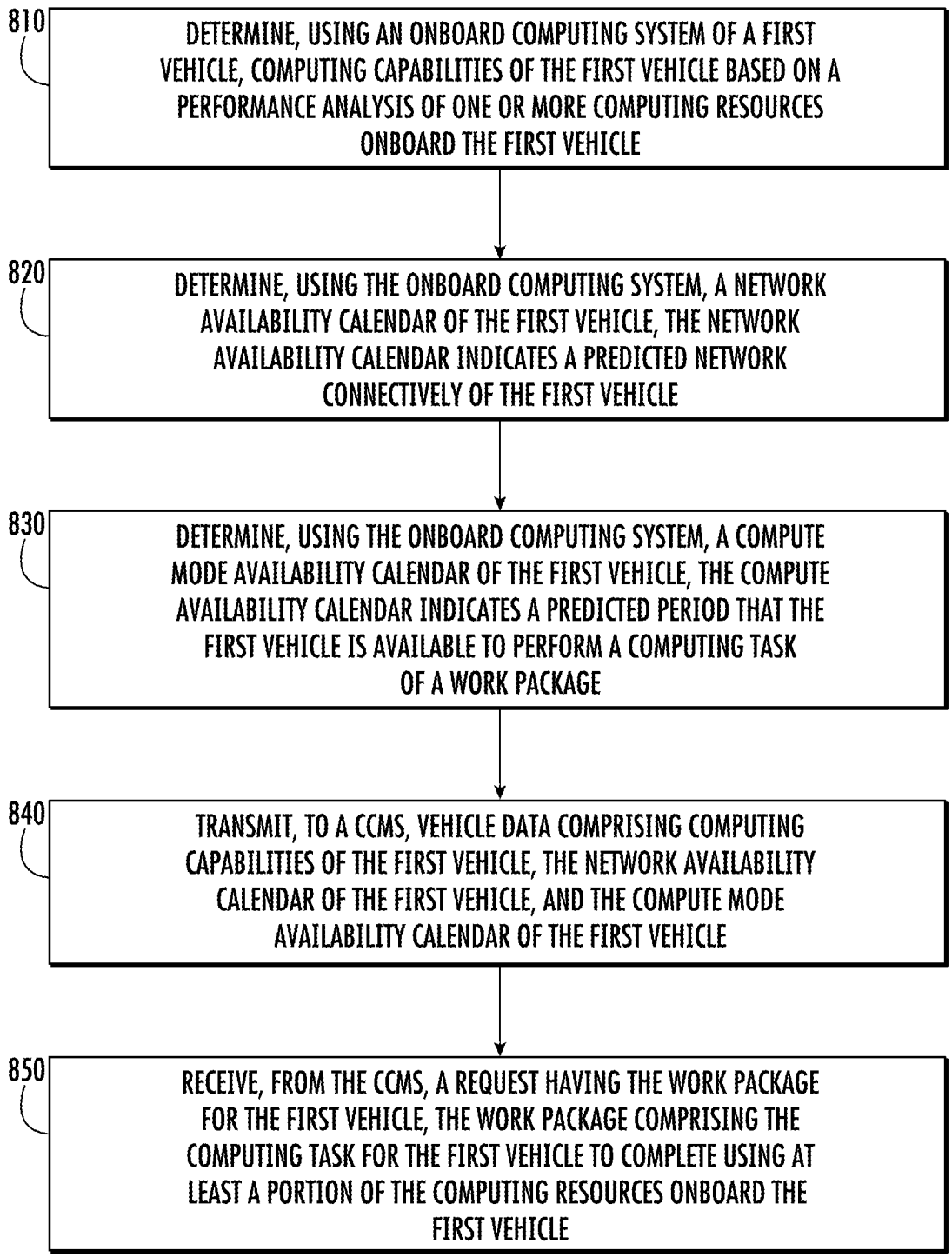
FIG. 8 illustrates a flowchart diagram of an example method for a node agent to determine its availability and capability to perform a computing task according to example embodiments hereof.

FIG. 8 depicts a flow diagram that illustrates a method 800 for an IoT device to transmit an availability calendar to a CCMS in order to register as a node agent. In an embodiment, the method 800 may be performed by an IoT device, such as vehicle 105, first node agent 210, first host system 350, the control circuit 915 of FIG. 9, or other suitable control circuit. One or more portions of the method 800 may be implemented as an algorithm on the hardware components of the devices described herein. For example, the steps of method 1200 may be implemented as operations/instructions that are executable by computing hardware.

Although FIG. 8 depicts steps performed in a particular order for purposes of illustration and discussion, the methods of the present disclosure are not limited to the particularly illustrated order or arrangement. The various steps of the method 800 may be omitted, rearranged, combined, or adapted in various ways without deviating from the scope of the present disclosure.

Method 800 includes a vehicle serving as a node agent for example purposes only and is not meant to be limiting. As described herein, it is to be understood that an electric vehicle or other IoT devices can be utilized within method 800 instead of a vehicle.

In an embodiment, the method 800 may begin with or otherwise include a step 810, in which the computing system (e.g., vehicle 105, first node agent 210, node agent 355) determines, using an onboard computing system (e.g., onboard computing system 13) of a first vehicle (e.g., vehicle 105, electric vehicle), computing capabilities of the first vehicle based on a performance analysis of one or more computing resources onboard the first vehicle. The computing capabilities can be based on prior assessed benchmark results of the node agent, the onboard computing system, or the vehicle.

In an embodiment, the method 800 may begin with or otherwise include a step 820, in which the computing system determines, using the onboard computing system, a network availability calendar of the first vehicle. The network availability calendar can indicate a predicted network connectivity of the first vehicle. The network availability calendar can predict when the node agent has a good network connection as a specific period in the future. In some instances, as described herein, the vehicle data 118 can be generated using one or more machine-learned model (e.g., machine-learned models 357).

In an embodiment, the method 800 may begin with or otherwise include a step 830, in which the computing system determines, using the onboard computing system, a compute mode availability calendar of the first vehicle. The compute mode availability calendar can indicate a predicted period in the future that the first vehicle is available to perform a computing task of a work package. The compute mode availability calendar can indicate when and how long the first vehicle may be available to process a given task, even if no network connectivity is present. The compute mode calendar may indicate when (e.g., days, times) the first vehicle is predicted to be in a compute mode, download mode, or off-mode. For example, the compute mode availability calendar can accurately predict when a vehicle is parked, and charging based on the vehicle data 118. The compute mode calendar may indicate the types of computing resources (e.g., CPUs, GPUs) available onboard the first vehicle. The compute model calendar may indicate what portion of the computing resources are available for performing a computing task (e.g., 50%, 99%). As described herein, the first vehicle may leverage one or more machine-learned models to generate the compute mode calendar.

In an embodiment, the method 800 may begin with or otherwise include a step 810, in which the computing system transmits vehicle data (e.g., vehicle data 118) to a CCMS (e.g., CCMS 310). The vehicle data can include computing capabilities of the first vehicle, the network availability calendar of the first vehicle, and/or the compute mode availability of the first vehicle. In an embodiment, by transmitting the information described at operation 840, the vehicle 105 may register itself as node agent 355 with the CCMS 310.

In an embodiment, the method 800 may begin with or otherwise include a step 850, in which the computing system receives, from the CCMS, a request having the work package for the first vehicle. The work package may be indicative of a computing task for the first vehicle to complete using at least a portion of the computing resources onboard the first vehicle. The request received at 850 can be similar to the request that is transmitted by the CCMS 310 at operation 740.

In some instances, the first vehicle may download the work package when the vehicle is in a download mode operation as indicated by the network availability calendar. The network availability calendar 126 is generated by the first vehicle at step 820. Additionally, the first vehicle may perform (e.g., execute, process) the computing task(s) of the work package during the compute mode. The compute mode can be determined (e.g., predicted) by the first vehicle when the compute mode availability calendar 128 is generated at step 830.

In some instances, the first vehicle (e.g., vehicle 105) may sent a notification to the CCMS 112 after the computing task(s) have been performed. The notification may be an indication that the computing tasks have been completed. Subsequently, the CCMS 112 may receive work package validation data 133 from the work package validator 340 to determine whether the computing tasks have been successfully completed.

Example Computing Systems

FIG. 9 illustrates a block diagram of an example onboard computing system 900 according to an embodiment hereof. The system 900 includes an onboard computing system 905 (e.g., a computing system onboard a vehicle), a server computing system 1005 (e.g., a remote computing system, cloud computing platform), and a training computing system 1105 that are communicatively coupled over one or more networks 955.

The onboard computing system 905 may include one or more computing devices 910 or circuitry. For instance, the onboard computing system 905 may include a control circuit 915 and a non-transitory computer-readable medium 920, also referred to herein as memory. In an embodiment, the control circuit 915 may include one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 915 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 915 may be programmed by one or more computer-readable or computer-executable instructions stored on the non-transitory computer-readable medium 920. In some instances, the onboard computing system 905 can be the onboard computing system 130, the first node agent 210, the second node agent 220, the first node agent 355, or the second node agent 365.

In an embodiment, the non-transitory computer-readable medium 920 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 920 may form, e.g., a hard disk drive (HDD), a solid-state drive (SDD) or solid-state integrated memory, a random-access memory (RAM), a read-only memory (ROM), an erasable programmable read-only memory (EPROM or Flash memory), a static random-access memory (SRAM), dynamic random-access memory (DRAM), a portable compact disc read-only memory (CD-ROM), a digital versatile disk (DVD), or a memory stick.

The non-transitory computer-readable medium 920 may store information that may be accessed by the control circuit 915. For instance, the non-transitory computer-readable medium 920 (e.g., memory devices) may store data 925 that may be obtained, received, accessed, written, manipulated, created, or stored. The data 925 may include, for instance, any of the data or information described herein. In an embodiment, the onboard computing system 905 may obtain data from one or more memories that are remote from the onboard computing system 905.

The non-transitory computer-readable medium 920 may also store computer-readable instructions 930 that may be executed by the control circuit 915. The instructions 930 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 915 to perform one or more functional tasks. The modules and computer-readable/executable instructions may be described as performing various operations or tasks when the control circuit 915 or other hardware component is executing the modules or computer-readable instructions.

The instructions 930 may be executed in logically or virtually separate threads on the control circuit 915. For example, the non-transitory computer-readable medium 920 may store instructions 930 that when executed by the control circuit 915 cause the control circuit 915 to perform any of the operations, methods or processes described herein. In some cases, the non-transitory computer-readable medium 920 may store computer-executable instructions or computer-readable instructions, such as instructions to perform at least a portion of the method(s) of FIGS. 7-8.

In an embodiment, the onboard computing system 905 may store or include one or more machine-learned models 935. In an embodiment, the one or more machine-learned models 935 may be received from the server computing system 1005 over networks 955, stored in the onboard computing system 905 (e.g., non-transitory computer-readable medium 920), and then used or otherwise implemented by the control circuit 915. In an embodiment, the onboard computing system 905 may implement multiple parallel instances of a single model.

Additionally, or alternatively, one or more machine-learned models 935 may be included in or otherwise stored and implemented by the server computing system 1005 that communicates with the onboard computing system 905 according to a client-server relationship. For example, the machine-learned models 935 may be implemented by the server computing system 1005 as a portion of a web service. Thus, one or more models 935 may be stored and implemented at the onboard computing system 905 or one or more models 935 may be stored and implemented at the server computing system 1005.

The one or more models 935 may be trained to perform the functions and operations described herein for determining an availability calendar including, for example, the network availability calendar 126 and/or the compute mode availability calendar 128 based on vehicle data 118, work package data 131, map data 132, work package validation data 133, and/or charging station data 134. Additionally, the one or more models 935 may be trained using user specific data associated with the vehicle 105 that may only be processed using the onboard computing system 130 of the vehicle to safeguard the privacy of the data.

The onboard computing system 905 may include a communication interface 940. The communication interface 940 may be used to communicate with one or more other system(s). The communication interface 940 may include any circuits, components, software, etc. for communicating via one or more networks (e.g., networks 955). In an embodiment, the communication interface 940 may include for example, one or more of a communications controller, receiver, transceiver, transmitter, port, conductors, software or hardware for communicating data/information.

The onboard computing system 905 may also include one or more user input components 945 that receives user input. For example, the user input component 945 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input. As one example, the input component(s) 945 may be or may include an infotainment system within a vehicle.

The onboard computing system 905 may include one or more output components 950. The output components 950 may include hardware or software for audibly or visual producing content. For instance, the output components 950 may include one or more speaker(s), earpiece(s), headset(s), handset(s), etc. The output components 950 may include a display device, which may include hardware for displaying a user interface or messages for a user. By way of example, the output component 950 may include a display screen, CRT, LCD, plasma screen, touch screen, TV, projector, tablet, or other suitable display components. As one example, the output component(s) 950 may be or may include an infotainment system within a vehicle.

The server computing system 1005 may include one or more computing devices 1010. In an embodiment, the server computing system 1005 may include or is otherwise implemented by one or more server computing devices. In instances in which the server computing system 1005 includes plural server computing devices, such server computing devices may operate according to sequential computing architectures, parallel computing architectures, or some combination thereof. In some instances, the server computing system 1005 can be the computing platform 110, the CCMS 112, or CCMS 310.

The server computing system 1005 may include a control circuit 1015 and a non-transitory computer-readable medium 1020, also referred to herein as memory 1020. In an embodiment, the control circuit 1015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1015 may be programmed by one or more computer-readable or computer-executable instructions stored on the non-transitory computer-readable medium 1020.

In an embodiment, the non-transitory computer-readable medium 1020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid-state drive (SDD) or solid-state integrated memory, a random-access memory (RAM), a read-only memory (ROM), an erasable programmable read-only memory (EPROM or Flash memory), a static random-access memory (SRAM), dynamic random-access memory (DRAM), a portable compact disc read-only memory (CD-ROM), a digital versatile disk (DVD), or a memory stick.

The non-transitory computer-readable medium 1020 may store information that may be accessed by the control circuit 1015. For instance, the non-transitory computer-readable medium 1020 (e.g., memory devices) may store data 1025 that may be obtained, received, accessed, written, manipulated, created, or stored. The data 1025 may include, for instance, any of the data or information described herein. In an embodiment, the server computing system 1005 may obtain data from one or more memories that are remote from the server computing system 1005.

The non-transitory computer-readable medium 1020 may also store computer-readable instructions 1030 that may be executed by the control circuit 1015. The instructions 1030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1015 to perform one or more functional tasks. The modules and computer-readable/executable instructions may be described as performing various operations or tasks when the control circuit 1015 or other hardware component is executing the modules or computer-readable instructions.

The instructions 1030 may be executed in logically or virtually separate threads on the control circuit 1015. For example, the non-transitory computer-readable medium 1020 may store instructions 1030 that when executed by the control circuit 1015 cause the control circuit 1015 to perform any of the operations, methods or processes described herein. In some cases, the non-transitory computer-readable medium 1020 may store computer-executable instructions or computer-readable instructions, such as instructions to perform at least a portion of the method(s) of FIGS. 7-8.

The server computing system 1005 may store or otherwise include one or more machine-learned models 1035. The machine-learned models 1035 may include or be the same as the models 935 stored in onboard computing system 905. In an embodiment, the machine-learned models 1035 may include an unsupervised learning model (e.g., for generating data clusters). In an embodiment, the machine-learned models 1035 may include neural networks (e.g., deep neural networks) or other types of machine-learned models, including non-linear models or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

In some instances, the one or more models 1035 may be trained to perform the functions and operations described herein for determining which node agent to assign a computing task based on the network availability calendar 126 and/or the compute mode availability calendar 128 of the node agent. Additionally, the determination of which node agent to assign a computing task can be further based on non-user specific vehicle data 118, work package data 131, map data 132, work package validation data 133, and/or charging station data 134.

The server computing system 1005 may include a communication interface 1040. The communication interface 1040 may be used to communicate with one or more other system(s). The communication interface 1040 may include any circuits, components, software, etc. for communicating via one or more networks (e.g., networks 955). In an embodiment, the communication interface 1040 may include for example, one or more of a communications controller, receiver, transceiver, transmitter, port, conductors, software or hardware for communicating data/information.

The onboard computing system 905 or the server computing system 1005 may train the models 935, 1035 via interaction with the training computing system 1105 that is communicatively coupled over the networks 955. The training computing system 1105 may be separate from the server computing system 1005 or may be a portion of the server computing system 1005.

The training computing system 1105 may include one or more computing devices 1110. In an embodiment, the training computing system 1105 may include or is otherwise implemented by one or more server computing devices. In instances in which the training computing system 1105 includes plural server computing devices, such server computing devices may operate according to sequential computing architectures, parallel computing architectures, or some combination thereof.

The training computing system 1105 may include a control circuit 1115 and a non-transitory computer-readable medium 1120, also referred to herein as memory 1120. In an embodiment, the control circuit 1115 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1115 may be programmed by one or more computer-readable or computer-executable instructions stored on the non-transitory computer-readable medium 1120.

In an embodiment, the non-transitory computer-readable medium 1120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid-state drive (SDD) or solid-state integrated memory, a random-access memory (RAM), a read-only memory (ROM), an erasable programmable read-only memory (EPROM or Flash memory), a static random-access memory (SRAM), dynamic random-access memory (DRAM), a portable compact disc read-only memory (CD-ROM), a digital versatile disk (DVD), or a memory stick.

The non-transitory computer-readable medium 1120 may store information that may be accessed by the control circuit 1115. For instance, the non-transitory computer-readable medium 1120 (e.g., memory devices) may store data 1125 that may be obtained, received, accessed, written, manipulated, created, or stored. The data 1125 may include, for instance, any of the data or information described herein, such as data relating to a simulated environment. In an embodiment, the training computing system 1105 may obtain data from one or more memories that are remote from the training computing system 1105.

The non-transitory computer-readable medium 1120 may also store computer-readable instructions 1130 that may be executed by the control circuit 1115. The instructions 1130 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1115 to perform one or more functional tasks. The modules and computer-readable/executable instructions may be described as performing various operations or tasks when the control circuit 1115 or other hardware component is executing the modules or computer-readable instructions.

The instructions 1130 may be executed in logically or virtually separate threads on the control circuit 1115. For example, the non-transitory computer-readable medium 1120 may store instructions 1130 that when executed by the control circuit 1115 cause the control circuit 1115 to perform any of the operations, methods or processes described herein. In some cases, the non-transitory computer-readable medium 1120 may store computer-executable instructions or computer-readable instructions, such as instructions to perform at least a portion of the method(s) of FIGS. 7-8.

The training computing system 1105 may include a model trainer 1135 that trains the machine-learned models 935, 1035 stored at the onboard computing system 905 or the server computing system 1005 using various training or learning techniques. For example, the models 935, 1035 (e.g., a machine-learned model for vehicle availability) may be trained using a simulated environment technique in which a simulated representation of a travelway created from existing sensor data or motion data is used to train the models 935, 1035 (e.g., to predict vehicle connectivity and computability within the simulated environment).

In some implementations, the model trainer may train the models 935, 1035 in an unsupervised fashion.

The computing system may modify parameters of the models 935, 1035 based on the loss function such that the models may be effectively trained for specific applications in an unsupervised manner without labeled data.

The model trainer 1135 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, or various other loss functions. Gradient descent techniques may be used to iteratively update the parameters over a number of training iterations.

In an embodiment, performing backwards propagation of errors may include performing truncated backpropagation through time. The model trainer 1135 may perform a number of generalization techniques (e.g., weight decays, dropouts, etc.) to improve the generalization capability of a model being trained. In particular, the model trainer 1135 may train the machine-learned models 935, 1035 based on a set of training data 1140.

The training data 1140 may include unlabeled training data for training in an unsupervised fashion. The training data 1140 may include datasets of vehicle characteristics, models, classes, types, etc. as well as example travel routes. The model trainer 1135 may train the models 935, 1035 to determine the network availability calendar 126 and/or the compute mode availability calendar 128.

The model trainer 1135 may include computer logic utilized to provide desired functionality. The model trainer 1135 may be implemented in hardware, firmware, or software controlling a general-purpose processor. For example, in an embodiment, the model trainer 1135 may include program files stored on a storage device, loaded into a memory and executed by one or more processors. In other implementations, the model trainer 1135 may include one or more sets of computer-executable instructions that are stored in a tangible computer-readable storage medium such as RAM, hard disk, or optical or magnetic media.

The training computing system 1105 may include a communication interface 1145. The communication interface 1145 may be used to communicate with one or more other system(s). The communication interface 1145 may include any circuits, components, software, etc. for communicating via one or more networks (e.g., networks 955). In an embodiment, the communication interface 1145 may include for example, one or more of a communications controller, receiver, transceiver, transmitter, port, conductors, software or hardware for communicating data/information.

The networks 955 may be any type of communications network, such as a local area network (e.g., intranet), wide area network (e.g., Internet), or some combination thereof and may include any number of wired or wireless links. In general, communication over the network 955 may be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

The machine-learned models described in this specification may have various types of input data or combinations thereof, representing data available to other systems onboard a vehicle. Input data may include, for example, latent encoding data (e.g., a latent space representation of an input, etc.), statistical data (e.g., data computed or calculated from some other data source), sensor data (e.g., raw or processed data captured by a sensor of the vehicle), or other types of data.

FIG. 9 illustrates one example computing system that may be used to implement the present disclosure. Other computing systems may be used as well. For example, in an embodiment, the onboard computing system 905 may include the model trainer 1135 and the training data 1140. In such implementations, the models 935 may be both trained and used locally at the onboard computing system 905. In some of such implementations, the onboard computing system 905 may implement the model trainer 1135 to personalize the models 935 based on user-specific data.

Additional Discussion of Various Embodiments

Embodiment 1 relates to a computer-implemented method. The method may include receiving, from a first vehicle (e.g., electric vehicle), vehicle data comprising computing capabilities of the first vehicle and an availability calendar of the first vehicle. The computing capabilities of the first vehicle can be determined onboard the first vehicle based on a performance analysis of one or more computing resources onboard the first vehicle. The availability calendar of the first vehicle can be determined onboard the vehicle and the availability calendar indicates a predicted network connectivity of the first vehicle. The method may include generating, based on the computing capabilities of the first vehicle, a work package for the first vehicle. The work package may include a computing task for the first vehicle to complete using at least a portion of the computing resources onboard the first vehicle. The method may include determining, based on the availability calendar, one or more transmission parameters for communicating the work package to the first vehicle. The transmission parameters can include a time for transmitting the work package to the first vehicle. The method may include, based on the transmission parameters, transmitting a request for the first vehicle to perform the computing task of the work package.

Embodiment 2 includes the computer-implemented method of embodiment 1. In this embodiment, the request can include a cryptographic signature and a location of the work package.

Embodiment 3 includes the computer-implemented method of embodiment 2. In this embodiment, the work package can be stored in a work package storage. The work package storage can have compute instructions and data for performing the computing task.

Embodiment 4 includes the computer-implemented method of embodiment 2. In this embodiment, the method may further include: receiving, from a work validator, a confirmation that the computing task has been performed; and generating a smart contract associated with the work package, the smart contract comprising the cryptographic signature and code indicative of an indication by the first vehicle that the first vehicle has performed the computing task.

Embodiment 5 includes the computer-implemented method of embodiment 4. In this embodiment, the method may further include: transmitting the smart contract to a blockchain interface. The blockchain interface can maintain a performance status of the computing task.

Embodiment 6 includes the computer-implemented method of embodiment 1. In this embodiment, the method may further include: determining that the computing task has not be performed by the first vehicle within a predetermined amount of time; and assigning, based on the determination that the computing task has not be performed by the first vehicle within the predetermined amount of time, the work package to be performed by a second vehicle.

Embodiment 7 includes the computer-implemented method of embodiment 1. In this embodiment, the method may further include: registering, in an agent inventory, the first vehicle as a node agent, the agent inventory having a list of node agents. Each node agent in the list of node agents can include an associated availability calendar.

Embodiment 8 includes the computer-implemented method of embodiment 1. In this embodiment, the availability calendar can be determined by the first vehicle using one or more machine-learned models based on a network connection vector of the first vehicle and a compute mode availability calendar.

Embodiment 9 includes the computer-implemented method of embodiment 8. In this embodiment, the availability calendar can include a plurality of locations, and wherein the network connection vector of the first vehicle is indicative of a network connection of the first vehicle in each location of the plurality locations.

Embodiment 10 includes the computer-implemented method of embodiment 9. In this embodiment, the network connection vector of the first vehicle can be determined by performing network connectivity speed test with the first vehicle.

Embodiment 11 includes the computer-implemented method of embodiment 1. In this embodiment, the work package is indicative of at least one of: a minimum computing resources requirement, a completion date, and an effort level for performing the work package.

Embodiment 12 includes the computer-implemented method of embodiment 1. In this embodiment, the availability calendar is a quantized calendar predicting a current state of the first vehicle and an operation state at a future period.

Embodiment 13 includes the computer-implemented method of embodiment 12. In this embodiment, the operation state of the first vehicle can be either an off state, a download state, or a compute state.

Embodiment 14 includes the computer-implemented method of embodiment 13. In this embodiment, the computing task is performed by the first vehicle only during the compute state.

Embodiment 15 includes the computer-implemented method of embodiment 13. In this embodiment, the first vehicle is restricted from performing the computing task during the download state.

Embodiment 16 includes the computer-implemented method of embodiment 1. In this embodiment, the availability calendar can include a network availability calendar that determines when the vehicle is able to transmit data over a network.

Embodiment 17 includes the computer-implemented method of embodiment 1. In this embodiment, the availability calendar can include a compute mode availability calendar that determines a specific time and a time duration that the vehicle is available to perform the computing task of the work package.

Embodiment 18 includes the computer-implemented method of embodiment 1. In this embodiment, the availability calendar can be further determined based on user specific data that is only processed onboard the vehicle.

Embodiment 19 relates to a computing system. The computing system may include a control circuit of a task management system. The control circuit may be configured to receive, from a first vehicle, vehicle data comprising computing capabilities of the first vehicle and an availability calendar of the first vehicle. The computing capabilities of the first vehicle can be determined onboard the vehicle based on a performance analysis of one or more computing resources onboard the first vehicle. The availability calendar of the first vehicle can be determined onboard the vehicle and the availability calendar indicates a predicted network connectivity of the first vehicle. The control circuit may be configured to generate, based on the computing capabilities of the first vehicle, a work package for the first vehicle. The work package can include a computing task for the first vehicle to complete using at least a portion of the computing resources onboard the first vehicle. The control circuit may be configured to determine, based on the availability calendar, one or more transmission parameters for communicating the work package to the first vehicle. The transmission parameters can include a time for transmitting the work package to the first vehicle. Based on the transmission parameters, the control circuit may be configured to transmit a request for the first vehicle to perform the computing task of the work package.

Embodiment 20 relates to one or more non-transitory computer-readable media that store instructions that are executable by a control circuit to perform operations. The control circuit may receive, from a first vehicle, vehicle data comprising computing capabilities of the first vehicle and an availability calendar of the first vehicle. The computing capabilities of the first vehicle can be determined onboard the vehicle based on a performance analysis of one or more computing resources onboard the first vehicle. The availability calendar of the first vehicle can be determined onboard the vehicle and the availability calendar indicates a predicted network connectivity of the first vehicle. The control circuit may be configured to generate, based on the computing capabilities of the first vehicle, a work package for the first vehicle. The work package can include a computing task for the first vehicle to complete using at least a portion of the computing resources onboard the first vehicle. The control circuit may be configured to determine, based on the availability calendar, one or more transmission parameters for communicating the work package to the first vehicle. The transmission parameters can include a time for transmitting the work package to the first vehicle. Based on the transmission parameters, the control circuit may be configured to transmit a request for the first vehicle to perform the computing task of the work package.

Additional Disclosure

As used herein, adjectives and their possessive forms are intended to be used interchangeably unless apparent otherwise from the context or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "and/or" and "or" may be used interchangeably herein. Lists joined by a particular conjunction such as "or," for example, may refer to "at least one of" or "any combination of" example elements listed therein, with "or" being understood as "or" unless otherwise indicated. Also, terms such as "based on" should be understood as "based at least in part on."

Those of ordinary skill in the art, using the disclosures provided herein, will understand that the elements of any of the claims, operations, or processes discus sed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computer-implemented method comprising:
receiving, from a first electric vehicle, vehicle data comprising computing capabilities of the first electric vehicle and an availability calendar of the first electric vehicle,
wherein the computing capabilities of the first electric vehicle are determined onboard the first electric vehicle based on a performance analysis of one or more computing resources onboard the first electric vehicle, and
wherein the availability calendar of the first electric vehicle is determined onboard the vehicle and the availability calendar indicates a predicted network connectivity of the first electric vehicle;
generating, based on the computing capabilities of the first electric vehicle, a work package for the first electric vehicle, the work package comprising a computing task for the first electric vehicle to complete using at least a portion of the computing resources onboard the first electric vehicle;
determining, based on the availability calendar, one or more transmission parameters for communicating the work package to the first electric vehicle, the transmission parameters comprising a time for transmitting the work package to the first electric vehicle; and
based on the transmission parameters, transmitting a request for the first electric vehicle to perform the computing task of the work package.

2. The computer-implemented method of claim 1, wherein the first electric vehicle is an electric vehicle, and wherein the method further comprises:
generating an electronic reward for a user of the first electric vehicle based on a completion of the computing task and a contribution to a reduction in greenhouse gas emissions.

3. The computer-implemented method of claim 1, wherein the request comprises a cryptographic signature and a location of the work package.

4. The computer-implemented method of claim 3, wherein the work package is stored in a work package storage, the work package storage having compute instructions and data for performing the computing task.

5. The computer-implemented method of claim 3, further comprising:
receiving, from a work validator, a confirmation that the computing task has been performed; and
generating a smart contract associated with the work package, the smart contract comprising the cryptographic signature and code indicative of an indication by the first electric vehicle that the first electric vehicle has performed the computing task.

6. The computer-implemented method of claim 5, further comprising:
transmitting the smart contract to a blockchain interface, wherein the blockchain interface maintains a performance status of the computing task.

7. The computer-implemented method of claim 1, further comprising:

determining that the computing task has not been performed by the first electric vehicle within a predetermined amount of time; and
assigning, based on the determination that the computing task has not been performed by the first electric vehicle within the predetermined amount of time, the work package to be performed by a second electric vehicle.

8. The computer-implemented method of claim 1, further comprising:
registering, in an agent inventory, the first electric vehicle as a node agent, the agent inventory having a list of node agents, and wherein each node agent in the list of node agents includes an associated availability calendar.

9. The computer-implemented method of claim 1, wherein the availability calendar is determined by the first electric vehicle using one or more machine-learned models based on a network connection vector of the first electric vehicle and a compute mode availability calendar, and wherein the availability calendar is further determined based on user specific data that is only processed onboard the vehicle.

10. The computer-implemented method of claim 9, wherein the availability calendar includes a plurality of locations, and wherein the network connection vector of the first electric vehicle is indicative of a network connection of the first electric vehicle in each location of the plurality locations.

11. The computer-implemented method of claim 10, wherein the network connection vector of the first electric vehicle is determined by performing a network connectivity speed test with the first electric vehicle.

12. The computer-implemented method of claim 1, wherein the work package is indicative of at least one of: a minimum computing resources requirement, a completion date, and an effort level for performing the work package.

13. The computer-implemented method of claim 1, wherein the availability calendar is a quantized calendar predicting a current state of the first electric vehicle and an operation state at a future period.

14. The computer-implemented method of claim 13, wherein the operation state of the first electric vehicle is either an off state, a download state, or a compute state.

15. The computer-implemented method of claim 14, wherein the computing task is performed by the first electric vehicle only during the compute state.

16. The computer-implemented method of claim 14, wherein the first electric vehicle is restricted from performing the computing task during the download state.

17. The computer-implemented method of claim 1, wherein the availability calendar includes a network availability calendar that determines when the vehicle is able to transmit data over a network.

18. The computer-implemented method of claim 1, wherein the availability calendar includes a compute mode availability calendar that determines a specific time and a time duration that the vehicle is available to perform the computing task of the work package.

19. A computing system comprising:
a control circuit of a task management system, the control circuit configured to:
receive, from a first electric vehicle, vehicle data comprising computing capabilities of the first electric vehicle and an availability calendar of the first electric vehicle,
wherein the computing capabilities of the first electric vehicle are determined onboard the vehicle based on a performance analysis of one or more computing resources onboard the first electric vehicle, and wherein the availability calendar of the first electric vehicle is determined onboard the vehicle and the availability calendar indicates a predicted network connectivity of the first electric vehicle;

generate, based on the computing capabilities of the first electric vehicle, a work package for the first electric vehicle, the work package comprising a computing task for the first electric vehicle to complete using at least a portion of the computing resources onboard the first electric vehicle;

determine, based on the availability calendar, one or more transmission parameters for communicating the work package to the first electric vehicle, the transmission parameters comprising a time for transmitting the work package to the first electric vehicle; and based on the transmission parameters, transmit a request for the first electric vehicle to perform the computing task of the work package.

20. One or more non-transitory computer-readable media that store instructions that are executable by a control circuit to:

receive, from a first electric vehicle, vehicle data comprising computing capabilities of the first electric vehicle and an availability calendar of the first electric vehicle, wherein the computing capabilities of the first electric vehicle are determined onboard the first electric vehicle based on a performance analysis of one or more computing resources onboard the first electric vehicle, and wherein the availability calendar of the first electric vehicle is determined onboard the vehicle and the availability calendar indicates a predicted network connectivity of the first electric vehicle;

generate, based on the computing capabilities of the first electric vehicle, a work package for the first electric vehicle, the work package comprising a computing task for the first electric vehicle to complete using at least a portion of the computing resources onboard the first electric vehicle;

determine, based on the availability calendar, one or more transmission parameters for communicating the work package to the first electric vehicle, the transmission parameters comprising a time for transmitting the work package to the first electric vehicle; and based on the transmission parameters, transmit a request for the first electric vehicle to perform the computing task of the work package.

\* \* \* \* \*